United States Patent
Liang

(10) Patent No.: US 9,934,924 B2
(45) Date of Patent: Apr. 3, 2018

(54) BISTABLE RELAY AND BISTABLE ACTUATOR

(71) Applicant: Chih-Chuan Liang, Hsinchu (TW)

(72) Inventor: Chih-Chuan Liang, Hsinchu (TW)

( * ) Notice: Subject to any disclaimer, the term of this patent is extended or adjusted under 35 U.S.C. 154(b) by 0 days.

(21) Appl. No.: 14/912,925

(22) PCT Filed: Aug. 12, 2014

(86) PCT No.: PCT/CN2014/084194
§ 371 (c)(1),
(2) Date: Feb. 19, 2016

(87) PCT Pub. No.: WO2015/024469
PCT Pub. Date: Feb. 26, 2015

(65) Prior Publication Data
US 2016/0196941 A1    Jul. 7, 2016

Related U.S. Application Data

(60) Provisional application No. 61/867,619, filed on Aug. 20, 2013.

(51) Int. Cl.
*H01H 51/22* (2006.01)
*H01H 50/22* (2006.01)
(Continued)

(52) U.S. Cl.
CPC ............. *H01H 50/22* (2013.01); *H01F 7/122* (2013.01); *H01F 7/14* (2013.01); *H01H 50/44* (2013.01);
(Continued)

(58) Field of Classification Search
CPC . H01H 2221/046–2221/048; H01F 2007/1669
(Continued)

(56) References Cited

U.S. PATENT DOCUMENTS 3,694,782 A * 9/1972 Ray .................... H01F 7/145
335/230
3,728,651 A 4/1973 Foster
(Continued)

FOREIGN PATENT DOCUMENTS

CN    1601663    3/2005
CN    101206973    6/2008
(Continued)

OTHER PUBLICATIONS

"Office Action of Japan Counterpart Application," dated Feb. 28, 2017, p. 1-p. 3, in which the listed references (Ref.1-2) were cited.
(Continued)

*Primary Examiner* — Alexander Talpalatski
(74) *Attorney, Agent, or Firm* — JCIPRNET

(57) ABSTRACT

A bistable relay and a bistable actuator are provided. The bistable actuator includes a magnetic latching mechanism and an electromagnet. The magnetic latching mechanism includes a rotation shaft, a pillar-shaped permanent magnet, a columnar hollow magnetic conductor and two shells, and operates between a first and second stable states. The columnar hollow magnetic conductor surrounds the pillar-shaped permanent magnet wrapping the rotation shaft, and maintains a gap with the pillar-shaped permanent magnet. The electromagnet is connected to the columnar hollow magnetic conductor for driving the pillar-shaped permanent magnet to rotate, so as to switch the magnetic latching mechanism to the stable state. During a process that the magnetic latching mechanism is switched to the stable state, the rotation shaft rotates synchronously along with the magnetic latching mechanism to drive an impact system to move relative to a contact system, so as to contact or disconnect the contact points.

18 Claims, 20 Drawing Sheets

(51) Int. Cl.
*H01H 50/64* (2006.01)
*H01H 50/44* (2006.01)
*H02K 26/00* (2006.01)
*H02K 1/14* (2006.01)
*H02K 7/06* (2006.01)
*H01F 7/122* (2006.01)
*H01F 7/14* (2006.01)

(52) U.S. Cl.
CPC ........ *H01H 50/643* (2013.01); *H01H 50/645* (2013.01); *H01H 51/2263* (2013.01); *H02K 1/143* (2013.01); *H02K 7/06* (2013.01); *H02K 26/00* (2013.01); *H01H 2205/002* (2013.01); *H02K 2201/03* (2013.01)

(58) Field of Classification Search
USPC ........................................................ 335/234
See application file for complete search history.

(56) References Cited

U.S. PATENT DOCUMENTS

| | | | |
|---|---|---|---|
| 3,869,684 A | | 3/1975 | Grobe |
| 4,128,825 A | * | 12/1978 | Madsen .................. H01F 7/145 335/272 |
| 4,287,457 A | * | 9/1981 | Takemura .............. H02K 33/16 310/36 |
| 4,292,611 A | | 9/1981 | Bresson et al. |
| 4,387,357 A | * | 6/1983 | Mandel ..................... H01F 7/14 335/230 |
| 4,509,026 A | | 4/1985 | Matsushita |
| 4,703,293 A | | 10/1987 | Ono et al. |
| 4,795,929 A | * | 1/1989 | Elgass ..................... H01F 7/145 310/36 |
| 4,975,666 A | | 12/1990 | Nobutoki |
| 4,994,776 A | * | 2/1991 | Juncu .................... H01F 7/1646 335/230 |
| 5,337,030 A | | 8/1994 | Mohler |
| 5,867,081 A | | 2/1999 | Arnoux et al. |
| 5,912,604 A | | 6/1999 | Harvey et al. |
| 5,933,065 A | | 8/1999 | Duchemin |
| 6,674,349 B1 | | 1/2004 | Bolongeat et al. |
| 6,707,358 B1 | | 3/2004 | Massman |
| 6,831,535 B1 | | 12/2004 | Wen et al. |
| 8,476,996 B2 | * | 7/2013 | Liang .................. H01H 51/2263 335/78 |
| 2012/0049987 A1 | * | 3/2012 | Liang .................. H01H 51/2263 335/80 |
| 2013/0076185 A1 | * | 3/2013 | Benner, Jr. ............. H02K 33/16 310/156.01 |

FOREIGN PATENT DOCUMENTS

| | | |
|---|---|---|
| CN | 101527225 | 9/2009 |
| CN | 101728053 | 6/2010 |
| GB | 2081981 | 2/1982 |
| JP | 6328003 | 2/1988 |
| JP | 9154267 | 6/1997 |

OTHER PUBLICATIONS

"Search Report of European Counterpart Application," dated Feb. 15, 2017, p. 1-p. 10, in which the listed references (Ref.3-5) were cited.

"Internation Search Report (Form PCT/ISA/210) of PCT/CN2014/084194", dated Nov. 8, 2014, with English translation thereof, pp. 1-4.

"International Preliminary Report on Patentability of PCT Counterpart Application with English Translation", dated Feb. 23, 2016, p. 1-p. 13.

* cited by examiner

BISTABLE RELAY AND BISTABLE ACTUATOR

BACKGROUND OF THE INVENTION

Field of the Invention

The invention relates to an actuator, and particularly relates to a bistable relay and a bistable actuator.

Description of Related Art

Relay is an electronic control device generally applied in an automatic control circuit. The relay is switched between two states to contact or disconnect contact points of a contact system, so that the relay is regarded as an "automatic switch". Therefore, the relay provides functions of automatic adjustment, safety protection, a conversion circuit, etc., in the automatic control circuit.

Types of the relays are diversified, taking an existing monostable relay as an example, in one of the states of the monostable relay, the contact points of the contact system can be directly contacted or disconnected through a metal elastic force without requiring an extra driving power. However, in another state of the monostable relay, an electromagnetic coil of the monostable relay has to be powered to produce a continuous electromagnetic force greater than the metal elastic force in order to contact or disconnect the contact points of the contact system. Therefore, the monostable relay still has static power consumption even if the state thereof is not changed, and a total volume thereof is relatively large. Taking an existing bistable relay as an example, the bistable relay generally adopts a sliding or see-saw permanent magnet to construct a bistable architecture, or achieve the bistable architecture through a pure mechanical latch structure. Although such type of the bistable relay has a power saving effect compared to the monostable relay, a mechanism of the bistable relay is relatively complicated, and due to poor electromagnetic conversion efficiency, the volume of the bistable relay is large and is not easy to be decreased, so that application thereof is limited.

SUMMARY OF THE INVENTION

The invention is directed to a bistable relay and a bistable actuator, the bistable actuator has good magnetic latching efficiency, high electromagnetic conversion efficiency and a small volume. The bistable relay derived from the bistable actuator not only has the characteristics of the bistable actuator, but also improves reliability of a contact system of the bistable relay.

The invention provides a bistable actuator including a magnetic latching mechanism and an electromagnet. The magnetic latching mechanism is adapted to operate between a first stable state and a second stable state. The magnetic latching mechanism includes a rotation shaft, a pillar-shaped permanent magnet, a columnar hollow magnetic conductor and two shells. The rotation shaft is disposed along an axial direction. The pillar-shaped permanent magnet wraps the rotation shaft, and includes at least one N-pole and at least one S-pole. The rotation shaft wrapped by the pillar-shaped permanent magnet is disposed inside the columnar hollow magnetic conductor through the two shells. The columnar hollow magnetic conductor surrounds the pillar-shaped permanent magnet, and maintains a gap with the pillar-shaped permanent magnet. The gap is varied along with different positions of an inner surface of the columnar hollow magnetic conductor, and is configured to guide the pillar-shaped permanent magnet to rotate to a stable position. The columnar hollow magnetic conductor includes a first portion and a second portion, which are respectively located at two opposite sides of the pillar-shaped permanent magnet, where along a radial direction relative to the axial direction, the first portion and the second portion are respectively spaced by a first distance and a second distance from the pillar-shaped permanent magnet, and the first distance is the shortest distance between the first portion of the columnar hollow magnetic conductor and the pillar-shaped permanent magnet, and the second distance is the shortest distance between the second portion of the columnar hollow magnetic conductor and the pillar-shaped permanent magnet. Under the first stable state, the S-pole and the N-pole of the pillar-shaped permanent magnet are respectively aligned to the first portion and the second portion of the columnar hollow magnetic conductor, and under the second stable state, the S-pole and the N-pole of the pillar-shaped permanent magnet are respectively aligned to the second portion and the first portion of the columnar hollow magnetic conductor. The rotation shaft wrapped by the pillar-shaped permanent magnet is disposed inside the columnar hollow magnetic conductor through the two shells. The electromagnet is connected to the columnar hollow magnetic conductor, and produces two magnetic fields in opposite directions and functioned on the pillar-shaped permanent magnet for driving the pillar-shaped permanent magnet to drive the rotation shaft to rotate clockwise or anticlockwise when two currents with different directions are introduced to the electromagnet, so as to switch the magnetic latching mechanism from the first stable state to the second stable state, or from the second stable state to the first stable state.

The invention provides a bistable relay including the aforementioned bistable actuator, an impact system, a contact system and a base. The impact system is connected to the rotation shaft of the bistable actuator. The contact system is connected to the impact system, and has at least two contact points. When the magnetic latching mechanism of the bistable actuator is switched from the first stable state to the second stable state, or is switched from the second stable state to the first stable state, the rotation shaft rotates synchronously along with the magnetic latching mechanism to drive the impact system to move relative to the contact system, so as to contact or disconnect the contact points. The bistable actuator, the impact system and the contact system are disposed on the base.

In an embodiment of the invention, the electromagnet includes at least one columnar magnetic conductive material and a coil. The columnar magnetic conductive material is connected to the columnar hollow magnetic conductor. The coil is winded on the columnar magnetic conductive material, and the two magnetic fields are produced by introducing two currents with different directions to the coil. The pillar-shaped permanent magnet generates a magnetic attraction force or a magnetic repulsion force under a function of the two magnetic fields, where the pillar-shaped permanent magnet is rotated relative to the columnar hollow magnetic conductor through the magnetic attraction force or the magnetic repulsion force, so as to switch the magnetic latching mechanism from the first stable state to the second stable state, or from the second stable state to the first stable state.

In an embodiment of the invention, the electromagnet further includes at least one first magnetic guiding component, which is located on the columnar magnetic conductive material and connected to the columnar magnetic conductive material, and the at least one first magnetic guiding component is configured to guide the two magnetic fields to make the columnar hollow magnetic conductor to generate the magnetic attraction force or the magnetic repulsion force relative to the pillar-shaped permanent magnet, where the pillar-shaped permanent magnet is rotated relative to the columnar hollow magnetic conductor through the magnetic attraction force or the magnetic repulsion force, so as to switch the magnetic latching mechanism from the first stable state to the second stable state, or from the second stable state to the first stable state.

In an embodiment of the invention, the electromagnet further includes at least one second magnetic guiding component, which is connected to the first magnetic guiding component, and is configured to increase electromagnetic efficiency of the electromagnet, so as to decrease an electric energy transition driving force required by the electromagnet for driving the magnetic latching mechanism.

In an embodiment of the invention, the columnar hollow magnetic conductor is formed integrally through casting, or formed by combining a plurality of separated magnetic conductive components.

In an embodiment of the invention, the columnar hollow magnetic conductor is a combination of two vertically separated magnetic conductive components, and both sides of the two vertically separated magnetic conductive components have a gap.

In an embodiment of the invention, the impact system includes a rotating arm, a striking head, and a rotation blocker. The rotating arm is disposed on one end of the rotation shaft. The striking head is disposed on the rotating arm, where the rotating arm is rotated synchronously along with the rotation shaft, and drives the striking head to move relative to the contact system to approach or depart from the contact system, so as to contact or disconnect the contact points. The rotation blocker is disposed at one side of the rotating arm, and is configured to limit a rotation angle of the rotating arm to be smaller than 180 degrees.

In an embodiment of the invention, the contact points include at least one fixed contact point and at least one moving contact point. The fixed contact point is fixed on the base. The moving contact point is disposed on an elastic metal sheet and located corresponding to the striking head, and the elastic metal sheet is fixed on the base, where when the striking head is driven by the rotating arm to push the elastic metal sheet, the moving contact point located on the elastic metal sheet is adapted to contact the fixed contact point, and when the striking head is driven by the rotating arm to depart from the elastic metal sheet, the moving contact point located on the elastic metal sheet departs from the fixed contact point through a restoring force of the elastic metal sheet, such that the moving contact point is adapted to disconnect the fixed contact point.

In an embodiment of the invention, the impact system includes a striking head and a moving track guider. The striking head is disposed at one end of the rotation shaft. The moving track guider is connected to the rotation shaft to transform a rotation force of the rotation shaft rotated along a radial tangent into a displacement force along an axial direction, where the striking head is rotated synchronously along with the rotation shaft, and moves relative to the contact system along the axial direction to approach or depart from the contact system, so as to contact or disconnect the contact points.

In an embodiment of the invention, the moving track guider includes a tenon, and a columnar sleeve. The tenon is vertically disposed on the rotation shaft. The columnar sleeve has at least one opening for providing a moving track. The tenon is located in the opening, and moves along the moving track, so as to guide the rotation shaft to move along the axial direction when the rotation shaft is rotated along the radial tangent.

In an embodiment of the invention, the contact points include at least one fixed contact point and at least one moving contact point. The fixed contact point is fixed on the base. The moving contact point is disposed on the striking head, where when the striking head approaches the fixed contact point, the moving contact point is adapted to contact the fixed contact point, and when the striking head departs from the fixed contact point, the moving contact point is adapted to disconnect the fixed contact point.

In an embodiment of the invention, the contact points include at least one fixed contact point and at least one moving contact point. The fixed contact point is fixed on the base. The moving contact point is disposed on the striking head, where when the tenon moves along the moving track and guides the rotation shaft to move along the axial direction to make the striking head to approach the fixed contact point, the moving contact point is adapted to contact the fixed contact point, and when the tenon moves along the moving track and guides the rotation shaft to move along the axial direction to make the striking head to depart from the fixed contact point, the moving contact point is adapted to disconnect the fixed contact point.

In an embodiment of the invention, the contact points include at least one fixed contact point and at least one moving contact point. The fixed contact point is fixed on the base. The moving contact point is disposed on an elastic metal sheet, and the elastic metal sheet corresponds to the striking head, where when the striking head approaches the fixed contact point, the moving contact point is adapted to contact the fixed contact point, and when the striking head departs from fixed contact point, the moving contact point departs from the fixed contact point through a restoring force of the elastic metal sheet, such that the moving contact point is adapted to disconnect the fixed contact point.

In an embodiment of the invention, the contact points include at least one fixed contact point and at least one moving contact point. The fixed contact point is fixed on the base. The moving contact point is disposed on an elastic metal sheet, and the elastic metal sheet corresponds to the striking head, where when the tenon moves along the moving track and guides the rotation shaft to move along the axial direction to make the striking head to approach the fixed contact point, the moving contact point is adapted to contact the fixed contact point, and when the tenon moves along the moving track and guides the rotation shaft to move along the axial direction to make the striking head to depart from the fixed contact point, the moving contact point departs from the fixed contact point through a restoring force of the elastic metal sheet, such that the moving contact point is adapted to disconnect the fixed contact point.

According to the above descriptions, the bistable actuator of the invention is adapted to operate between the first stable state and the second stable state, where the columnar hollow magnetic conductor and the pillar-shaped permanent magnet maintain a gap therebetween, and the gap is varied along with different positions of the inner surface of the columnar hollow magnetic conductor, and is configured to guide the pillar-shaped permanent magnet to rotate to a stable position. Moreover, the first portion and the second portion of the columnar hollow magnetic conductor of the magnetic latching mechanism are respectively spaced by a first distance and a second distance from the pillar-shaped permanent magnet of the magnetic latching mechanism, and the first distance is the shortest distance between the first portion of the columnar hollow magnetic conductor and the pillar-shaped permanent magnet, and the second distance is the shortest distance between the second portion of the columnar hollow magnetic conductor and the pillar-shaped permanent magnet. The electromagnet may drive the pillar-shaped permanent magnet to rotate along the axial direction to make the magnetic latching mechanism to switch the stable state. During the process that the magnetic latching mechanism switches the stable state, the rotation shaft rotates synchronously along with the magnetic latching mechanism. In this way, the bistable actuator of the invention may have good magnetic latching efficiency and high electromagnetic conversion efficiency through an attraction force between the columnar hollow magnetic conductor and the pillar-shaped permanent magnet, so as to strengthen stableness of the bistable relay in the stable state. Moreover, when the bistable actuator is applied to the bistable relay, during the process that the magnetic latching mechanism switches the stable state, the rotation shaft rotates synchronously along with the magnetic latching mechanism to drive the impact system of the bistable relay to move relative to the contact system, so as to contact or disconnect the contact points. In this way, the bistable relay of the invention improves contact reliability of the contact system thereof.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
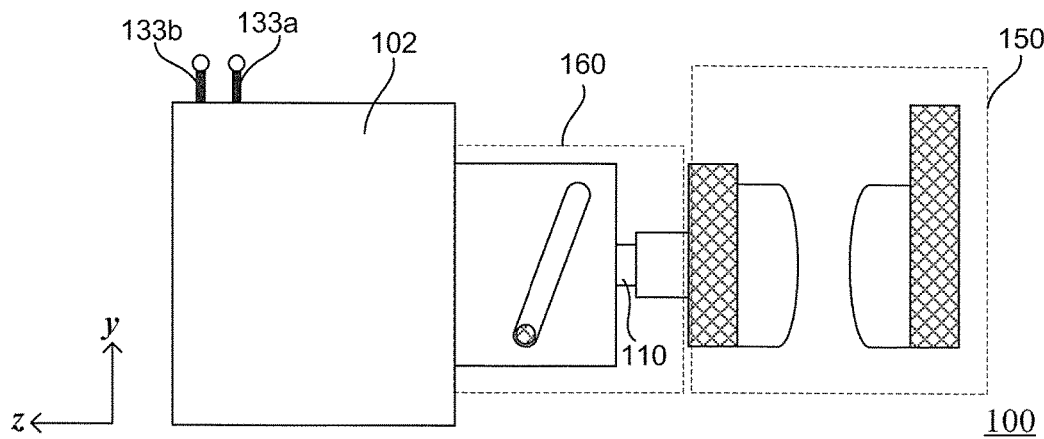
FIG. 1 is a schematic diagram of a bistable relay according to an embodiment of the invention.

FIG. 1 is a schematic diagram of a bistable relay according to an embodiment of the invention. Referring to FIG. 1, in the present embodiment, the bistable relay 100 includes a bistable actuator 102, an impact system 160 and a contact system 150, where the bistable actuator 102 has a rotation shaft 110 and coil terminals 133a and 133b, and a detailed structure thereof (including a magnetic latching mechanism 120 and an electromagnet 130) is shown in subsequent figures. The bistable relay 100 is configured in a circuit to serve as a switch for closing or opening the circuit. The bistable actuator 102 is adapted to operate between a first stable state and a second stable state (shown in subsequent figures). The rotation shaft 110 is disposed along an axial direction (for example, a z-axis). By introducing currents with different directions to the coil terminals 133a and 133b, the bistable actuator 102 is driven from one stable state to the other stable state. The impact system 160 is connected to the rotation shaft 110, and the contact system 150 is connected to the impact system 160. During the process that the bistable actuator 102 is switched from one stable state to the other stable state, the rotation shaft 110 of the bistable actuator 102 may synchronously rotate to a different position along with different stable states. The rotation shaft 110 is guided by a moving track of the impact system 160 to contact or disconnect contact points of the contact system 150. The bistable actuator 102, the impact system 160 and the contact system 150 are introduced below.

Figure 2:
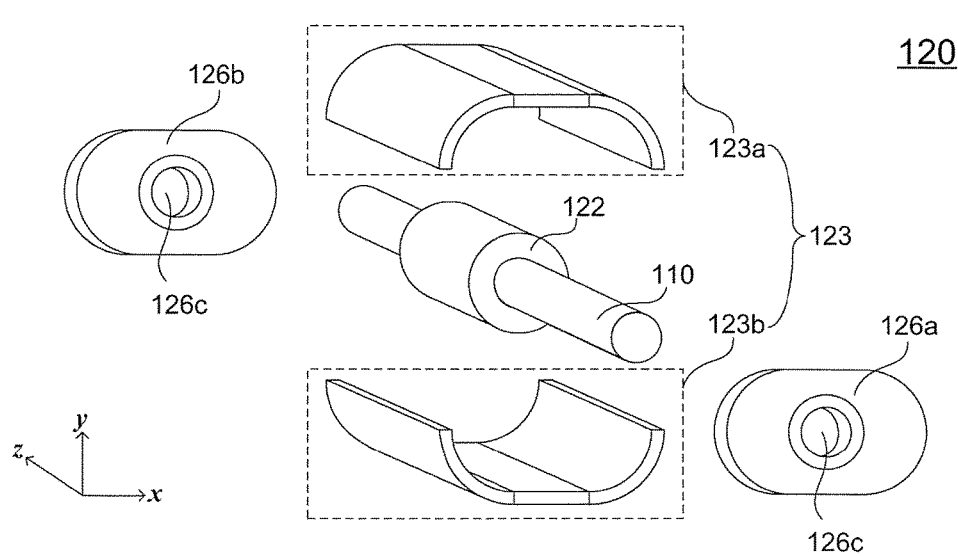
FIG. 2 to FIG. 4 are respectively an exploded view, a combination view and a side view of a magnetic latching mechanism of FIG. 1.
Figure 3:
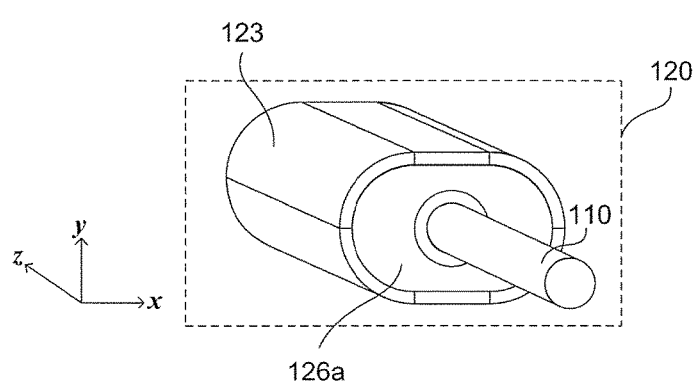
Figure 4:
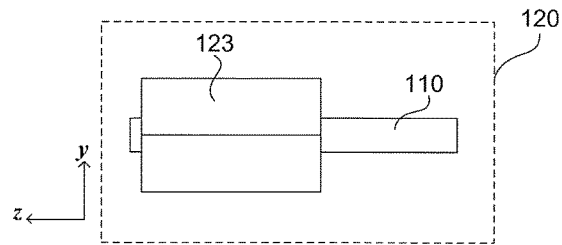
Figure 5A:
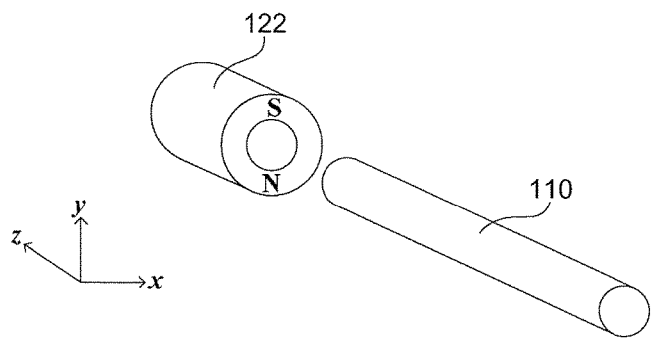
FIG. 5A to FIG. 5C are schematic diagrams of a combination of a rotation shaft and a pillar-shaped permanent magnet of FIG. 2.
Figure 5B:
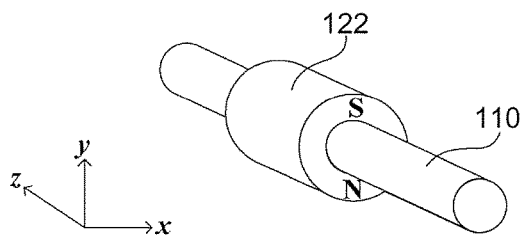
Figure 5C:
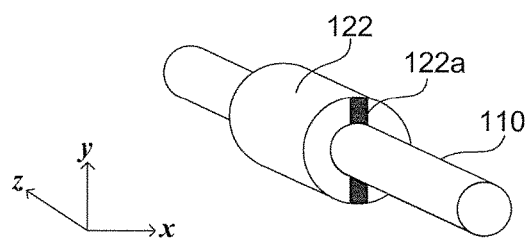

FIG. 2 to FIG. 4 are respectively an exploded view, a combination view and a side view of a magnetic latching mechanism of FIG. 1. FIG. 5A to FIG. 5C are schematic diagrams of a combination of a rotation shaft and a pillar-shaped permanent magnet of FIG. 2. Referring to FIG. 2 to FIG. 4 and FIG. 5A to FIG. 5C, in the present embodiment, the magnetic latching mechanism 120 includes the rotation shaft 110, a pillar-shaped permanent magnet 122, a columnar hollow magnetic conductor 123 and two shells 126a and 126b. The rotation shaft 110 is disposed along an axial direction (for example, the z-axis). The pillar-shaped permanent magnet 122 wraps the rotation shaft 110, and includes at least one N-pole and at least one S-pole, as shown in FIG. 5A and FIG. 5B, wherein the pillar-shaped permanent magnet 122 is, for example, formed as a columnar shape having a cross-sectional of circle, ellipse, square or other shape, but the invention is not limit thereto. Therefore, the pillar-shaped permanent magnet 122 and the rotation shaft 110 are rotated in linkage. Moreover, the pillar-shaped permanent magnet 122 further has a tenon 122a, where the tenon 122a is disposed at one side of the pillar-shaped permanent magnet 122 and penetrates through the rotation shaft 110, as shown in FIG. 5C. In this way, the rotation shaft 110 can be driven by the pillar-shaped permanent magnet 122 and may rotate synchronously with the pillar-shaped permanent magnet 122. However, although only one tenon 122a is shown in FIG. 5C, the amount of the tenons 122a and whether the tenons 122a are configured are not limited by the invention, i.e. the amount of the tenons 122a can be plural according to an actual requirement, or none tenon 122a is configured. Moreover, the columnar hollow magnetic conductor 123 surrounds the pillar-shaped permanent magnet 122, and faces the pillar-shaped permanent magnet 122 through an inner surface thereof, and the columnar hollow magnetic conductor 123 and the pillar-shaped permanent magnet 122 maintains a gap therebetween, wherein the columnar hollow magnetic conductor 123 is, for example, formed as a columnar shape having a cross-sectional of circle, ellipse, square or other shape, but the invention is not limit thereto. The shells 126a and 126b are respectively disposed at two opposite sides of the columnar hollow magnetic conductor 123, and guarantee a fixed gap between the inner surface of the columnar hollow magnetic conductor 123 and the pillar-shaped permanent magnet 122. Each of the shells 126a and 126b has an opening 126c. The rotation shaft 110 is disposed in the columnar hollow magnetic conductor 123, and penetrates through the openings 126c at both sides, such that the rotation shaft 110 is disposed in the columnar hollow magnetic conductor 123 through the shells 126a and 126b. In other words, the rotation shaft 110 wrapped by the pillar-shaped permanent magnet 122 is disposed inside the columnar hollow magnetic conductor 123 through the two shells 126a and 126b. Since the columnar hollow magnetic conductor 123 has a magnetic conduction function, the columnar hollow magnetic conductor 123 may guide the pillar-shaped permanent magnet 122 for fixing to one of the stable states (which is described later).

Figure 6A:
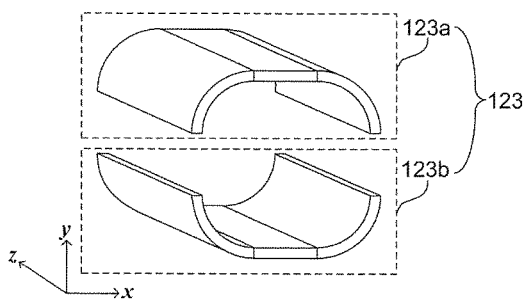
FIG. 6A and FIG. 6B are schematic diagrams of a columnar hollow magnetic conductor of FIG. 2.
Figure 6B:
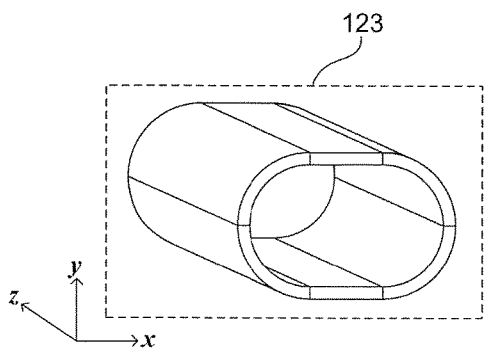
Figure 6C:
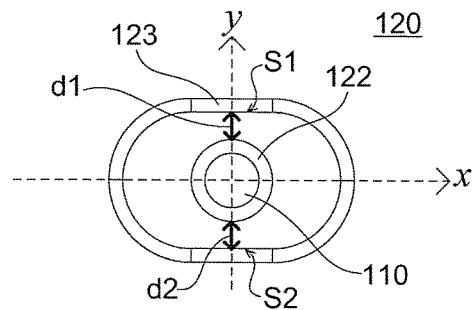
FIG. 6C and FIG. 6D are schematic diagrams of a combination of a rotation shaft, a pillar-shaped permanent magnet and a columnar hollow magnetic conductor of FIG. 2.
Figure 6D:
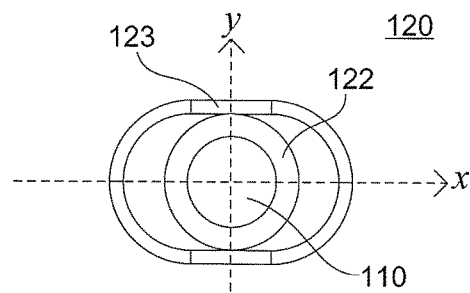

FIG. 6A and FIG. 6B are schematic diagrams of the columnar hollow magnetic conductor of FIG. 2. FIG. 6C and FIG. 6D are schematic diagrams of a combination of the rotation shaft, the pillar-shaped permanent magnet and the columnar hollow magnetic conductor of FIG. 2. Referring to FIG. 2 and FIG. 6A, in the present embodiment, the columnar hollow magnetic conductor 123 is, for example, a combination of two vertically separated magnetic conductive components 123a and 123b, and both sides of the two vertically separated magnetic conductive components have a gap, i.e. the two magnetic conductive components 123a and 123b are not joined together. In other embodiment that is not illustrated, the two magnetic conductive components 123a and 123b of the columnar hollow magnetic conductor 123 can be completely joined together. Alternatively, in other embodiment that is not illustrated, the columnar hollow magnetic conductor 123 can be composed of a plurality of magnetic conductive components. Moreover, referring to FIG. 6B, in other embodiments, the columnar hollow magnetic conductor 123 can be formed integrally through casting. Therefore, the fabrication method of the columnar hollow magnetic conductor is limited by the invention. Moreover, Referring to FIG. 2, FIG. 6A to FIG. 6D, in the present embodiment, a distance between the pillar-shaped permanent magnet 122 and the columnar hollow magnetic conductor 123 can be adjusted according to an actual requirement. In the embodiment of FIG. 6C, the pillar-shaped permanent magnet 122 and the columnar hollow magnetic conductor 123 have a gap therebetween, such that the pillar-shaped permanent magnet 122 may rotate relative to the columnar hollow magnetic conductor 123. In the embodiment of FIG. 6D, the pillar-shaped permanent magnet 122 and the columnar hollow magnetic conductor 123 still have a gap therebetween, and although the gap is smaller than the gap shown in FIG. 6C to result in a fact that the pillar-shaped permanent magnet 122 and the columnar hollow magnetic conductor 123 are slightly contacted, the pillar-shaped permanent magnet 122 may still rotate relative to the columnar hollow magnetic conductor 123.

According to FIG. 6A to FIG. 6D, it is known that a main characteristic of the columnar hollow magnetic conductor 123 is that the columnar hollow magnetic conductor 123 presents a flat shape. Therefore, the gap between the columnar hollow magnetic conductor 123 and the pillar-shaped permanent magnet 122 is varied along with different positions of an inner surface of the columnar hollow magnetic conductor 123, and is configured to guide the pillar-shaped permanent magnet 122 to rotate to a stable position. To be specific, referring to FIG. 6C, in the present embodiment, the columnar hollow magnetic conductor 123 includes a first portion S1 and a second portion S2. The first portion S1 and the second portion S2 are respectively located at two opposite sides of the pillar-shaped permanent magnet 122, where along a radial direction (for example, a y-axis) relative to the axial direction, the first portion S1 and the second portion S2 are respectively spaced by a first distance d1 and a second distance d2 from the pillar-shaped permanent magnet 122, and the first distance d1 is the shortest distance between the first portion S1 of the columnar hollow magnetic conductor 123 and the pillar-shaped permanent magnet 122, and the second distance d2 is the shortest distance between the second portion S2 of the columnar hollow magnetic conductor 123 and the pillar-shaped permanent magnet 122.

Since the attraction force between the columnar hollow magnetic conductor 123 and the pillar-shaped permanent magnet 122 is inversely proportional to a square of the distance therebetween, and the first portion S1 and the second portion S2 of the columnar hollow magnetic conductor 123 respectively have the shortest first distance d1 and second distance d2 relative to the pillar-shaped permanent magnet 122, so that the attraction forces between the first portion S1 and the second portion S2 of the columnar hollow magnetic conductor 123 and the pillar-shaped permanent magnet 122 are respectively the strongest at the first distance d1 and the second distance d2. Comparatively, since distances between the other parts of the first portion S1 and the second portion S2 of the columnar hollow magnetic conductor 123 and the pillar-shaped permanent magnet 122 are relatively longer, so that the attraction forces between the other parts of the first portion S1 and the second portion S2 of the columnar hollow magnetic conductor 123 and the pillar-shaped permanent magnet 122 are weaker. Based on the aforementioned characteristic, the columnar hollow magnetic conductor 123 is adapted to guide the pillar-shaped permanent magnet 122 to a fixed position, so as to switch the magnetic latching mechanism 120 to a stable state. Further, since the first portion S1 of the columnar hollow magnetic conductor 123 has the shortest first distance d1 relative to the pillar-shaped permanent magnet 122, and the second portion S2 of the columnar hollow magnetic conductor 123 has the shortest second distance d2 relative to the pillar-shaped permanent magnet 122, the columnar hollow magnetic conductor 123 may guide the pillar-shaped permanent magnet 122 to respectively align the S-pole and the N-pole thereof to the first portion S1 and the second portion S2 at places corresponding to the first distance d1 and the second distance d2, so as to switch the magnetic latching mechanism 120 to a stable state, or respectively align the S-pole and the N-pole to the second portion S2 and the first portion S1 of the columnar hollow magnetic conductor 123 to switch the magnetic latching mechanism 120 to the other stable state. Therefore, the magnetic latching mechanism 120 of the present embodiment has two stable states.

Figure 7A:
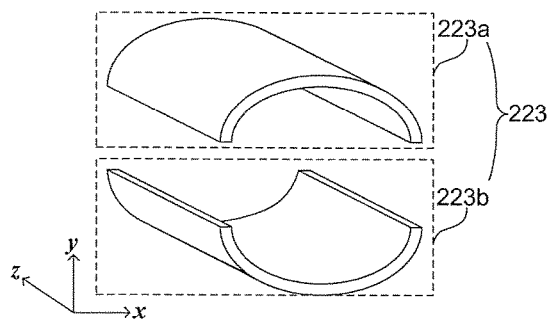
FIG. 7A, FIG. 7B, FIG. 8A, FIG. 8B, FIG. 9A and FIG. 9B are schematic diagrams of a columnar hollow magnetic conductor according to another embodiment of the invention.
Figure 7B:
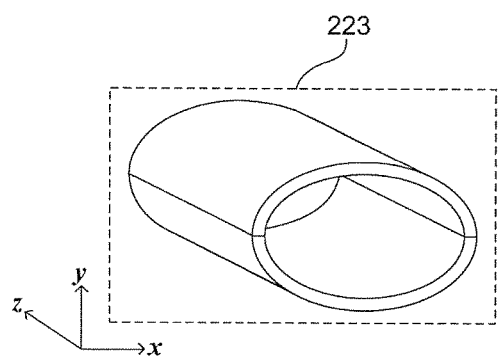
Figure 7C:
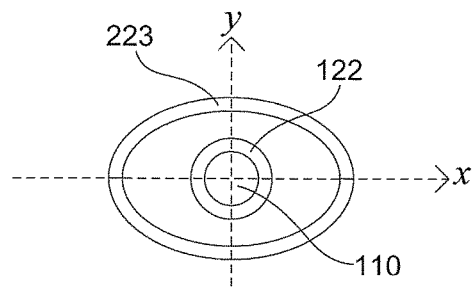
FIG. 7C, FIG. 7D, FIG. 8C, FIG. 8D, FIG. 9C and FIG. 9D are schematic diagrams of a combination of a rotation shaft, a pillar-shaped permanent magnet and a columnar hollow magnetic conductor according to the other embodiment of the invention.
Figure 7D:
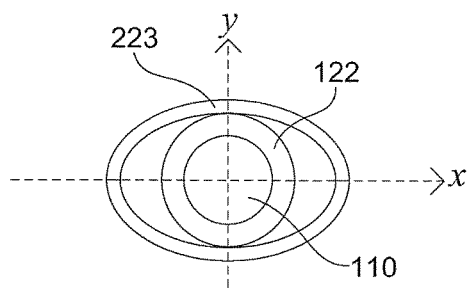

FIG. 7A and FIG. 7B are schematic diagrams of a columnar hollow magnetic conductor according to another embodiment of the invention. FIG. 7C and FIG. 7D are schematic diagrams of a combination of the rotation shaft, the pillar-shaped permanent magnet and the columnar hollow magnetic conductor according to the other embodiment of the invention. Referring to FIG. 7A to FIG. 7D, in the present embodiment, the columnar hollow magnetic conductor 223 is a variation embodiment of the aforementioned columnar hollow magnetic conductor 123, so that the columnar hollow magnetic conductor 223 also has the aforementioned characteristics of the columnar hollow magnetic conductor 123. A main difference between the columnar hollow magnetic conductor 223 and the columnar hollow magnetic conductor 123 is that a cross-section of the columnar hollow magnetic conductor 223 presents an oval shape. Similarly, the columnar hollow magnetic conductor 223 can also be a combination of two vertically separated magnetic conductive components 223a and 223b (shown in FIG. 7A), or can be formed integrally through casting (shown in FIG. 7B), or formed by combining a plurality of separated magnetic conductive components, and the fabrication method of the columnar hollow magnetic conductor 223 is not limited by the invention. Moreover, a distance between the pillar-shaped permanent magnet 122 and the columnar hollow magnetic conductor 223 can be adjusted according to an actual requirement, as shown in FIG. 7C and FIG. 7D, and a detailed description thereof may refer to related description of the columnar hollow magnetic conductor 123, and details thereof are not repeated.

Figure 8A:
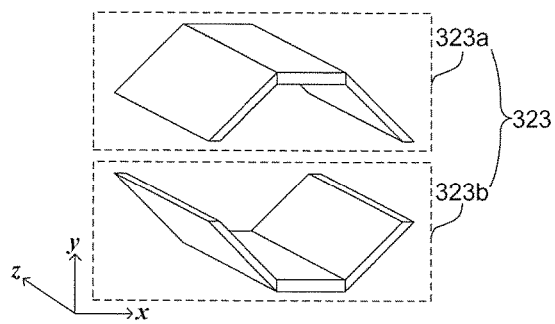
Figure 8B:
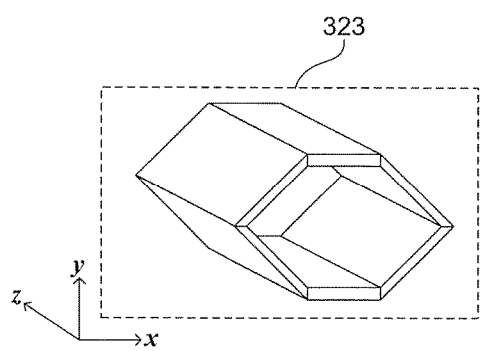
Figure 8C:
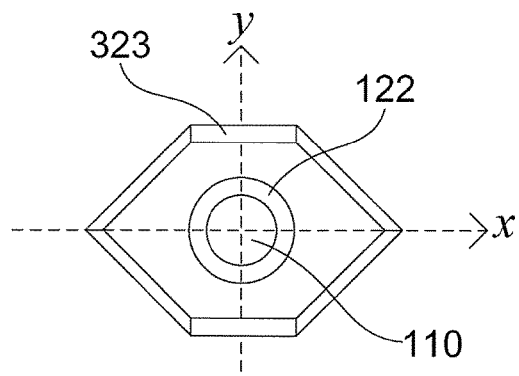
Figure 8D:
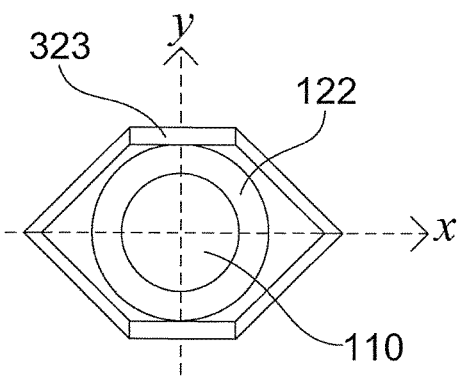

FIG. 8A and FIG. 8B are schematic diagrams of a columnar hollow magnetic conductor according to another embodiment of the invention. FIG. 8C and FIG. 8D are schematic diagrams of a combination of the rotation shaft, the pillar-shaped permanent magnet and the columnar hollow magnetic conductor according to the other embodiment of the invention. Referring to FIG. 8A to FIG. 8D, in the present embodiment, the columnar hollow magnetic conductor 323 is a variation embodiment of the aforementioned columnar hollow magnetic conductor 123, so that the columnar hollow magnetic conductor 323 also has the aforementioned characteristics of the columnar hollow magnetic conductor 123. A main difference between the columnar hollow magnetic conductor 323 and the columnar hollow magnetic conductor 123 is that a cross-section of the columnar hollow magnetic conductor 323 has a shape of a hexagon. Similarly, the columnar hollow magnetic conductor 323 can also be a combination of two vertically separated magnetic conductive components 323a and 323b (shown in FIG. 8A), or can be formed integrally through casting (shown in FIG. 8B), or formed by combining a plurality of separated magnetic conductive components. Moreover, a distance between the pillar-shaped permanent magnet 122 and the columnar hollow magnetic conductor 323 can be adjusted according to an actual requirement, as shown in FIG. 8C and FIG. 8D, and a detailed description thereof may refer to related description of the columnar hollow magnetic conductor 123.

Figure 9A:
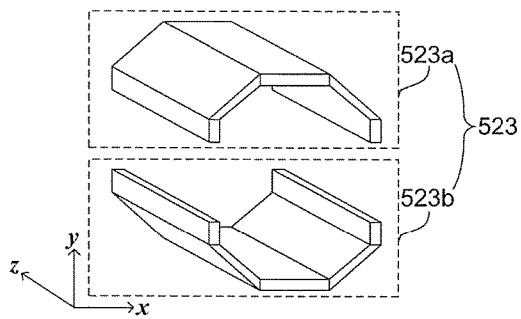
Figure 9B:
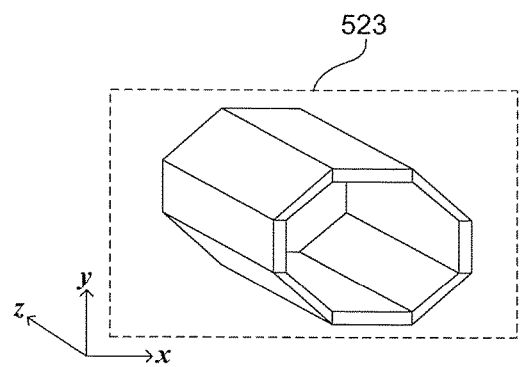
Figure 9C:
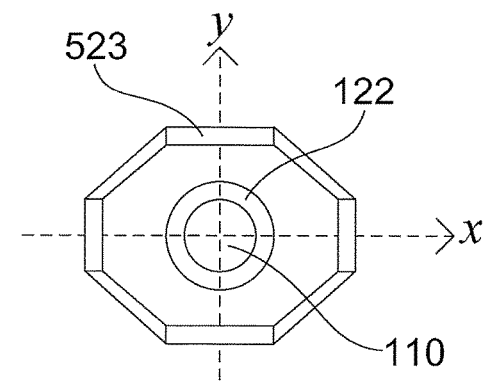
Figure 9D:
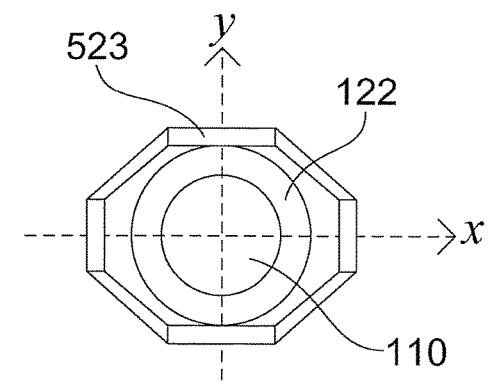

FIG. 9A and FIG. 9B are schematic diagrams of a columnar hollow magnetic conductor according to another embodiment of the invention. FIG. 9C and FIG. 9D are schematic diagrams of a combination of the rotation shaft, the pillar-shaped permanent magnet and the columnar hollow magnetic conductor according to the other embodiment of the invention. Refer ing to FIG. 9A to FIG. 9D, in the present embodiment, the columnar hollow magnetic conductor 523 is a variation embodiment of the aforementioned columnar hollow magnetic conductor 123, so that the columnar hollow magnetic conductor 523 also has the aforementioned characteristics of the columnar hollow magnetic conductor 123. A main difference between the columnar hollow magnetic conductor 523 and the columnar hollow magnetic conductor 123 is that a cross-section of the columnar hollow magnetic conductor 523 has a shape of an octagon. Similarly, the columnar hollow magnetic conductor 523 can also be a combination of two vertically separated magnetic conductive components 523a and 523b (shown in FIG. 9A), or can be formed integrally through casting (shown in FIG. 9B), or formed by combining a plurality of separated magnetic conductive components. Moreover, a distance between the pillar-shaped permanent magnet 122 and the columnar hollow magnetic conductor 523 can be adjusted according to an actual requirement, as shown in FIG. 9C and FIG. 9D, and a detailed description thereof may refer to related description of the columnar hollow magnetic conductor 123. Moreover, according to the aforementioned description, it is known that the shape of the cross-section of the columnar hollow magnetic conductor is not limited by the invention, which can be adjusted according to an actual design requirement, and provides the two portions (the first portion S1 and the second portion S2) having the shortest distances (the first distance d1 and the second distance d2) relative to the pillar-shaped permanent magnet 122.

Figures 10A, 10B:
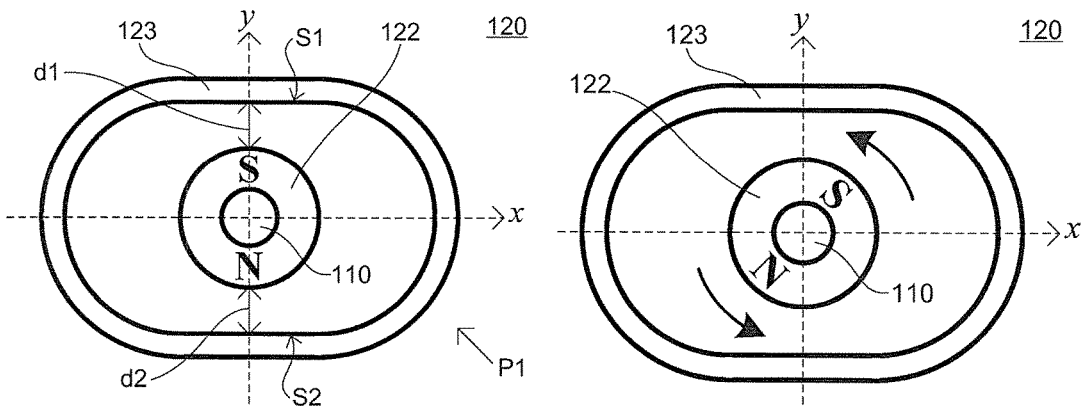
FIG. 10A is a side view of a magnetic latching mechanism of FIG. 2 in a first stable state.
FIG. 10B and FIG. 10C are side views of the magnetic latching mechanism of FIG. 10A approaching the first stable state.
Figures 10C, 11A:
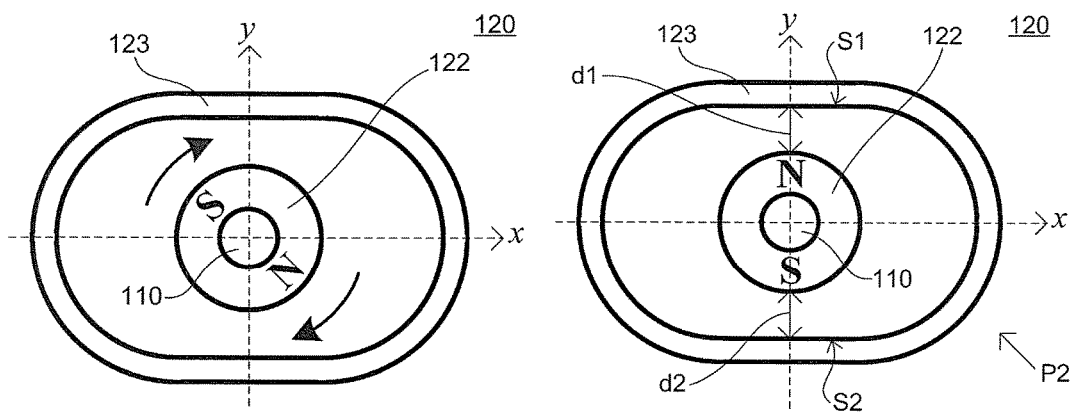
FIG. 11A is a side view of the magnetic latching mechanism of FIG. 2 in a second stable state.

FIG. 10A is a side view of the magnetic latching mechanism of FIG. 2 in the first stable state. FIG. 10B and FIG. 10C are side views of the magnetic latching mechanism of FIG. 10A approaching the first stable state. Referring to FIG. 10A to FIG. 10C, in the present embodiment, since the pillar-shaped permanent magnet 122 has the N-pole and the S-pole, and the attraction forces between the pillar-shaped permanent magnet 122 and the first portion S1 and the second portion S2 are the strongest at places corresponding to the first distance d1 and the second distance d2 (an upper and a lower ends of the columnar hollow magnetic conductor 123), under a first stable state P1, the S-pole and the N-pole of the pillar-shaped permanent magnet 122 are respectively aligned to the first portion S1 and the second portion S2 of the columnar hollow magnetic conductor 123 at places corresponding to the first distance d1 and the second distance d2, so as to be in the fixed position, as shown in FIG. 10A. The columnar hollow magnetic conductor 123 may guide the pillar-shaped permanent magnet 122 to the above fixed position through the attraction force, so as to switch the magnetic latching mechanism 120 to the first table state P1. When the pillar-shaped permanent magnet 122 is not in the above fixed position as shown in FIG. 10B to result in a fact that the magnetic latching mechanism 120 is in a non-stable state, for example, a connection line of the N-pole and the S-pole of the pillar-shaped permanent magnet 122 is not coincided with the y-axis, the rotation shaft 110 and the pillar-shaped permanent magnet 122 attracted by the columnar hollow magnetic conductor 123 approach the fixed position shown in FIG. 10A anticlockwise to switch the magnetic latching mechanism 120 to the first table state P1. Similarly, when the pillar-shaped permanent magnet 122 is not in the above fixed position as shown in FIG. 10C to result in a fact that the magnetic latching mechanism 120 is in the non-stable state, the rotation shaft 110 and the pillar-shaped permanent magnet 122 attracted by the columnar hollow magnetic conductor 123 approach the fixed position shown in FIG. 10A clockwise to switch the magnetic latching mechanism 120 to the first table state P1.

Figures 11B, 11C:
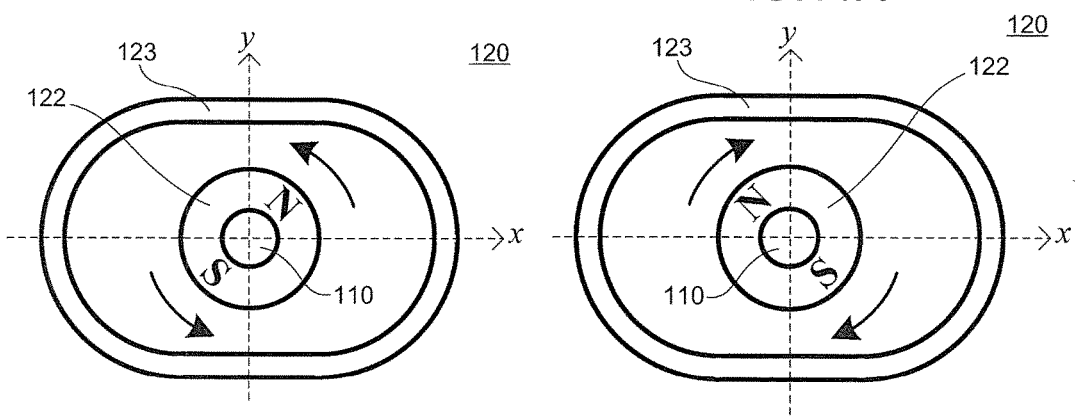
FIG. 11B and FIG. 11C are side views of the magnetic latching mechanism of FIG. 11A approaching the second stable state.

FIG. 11A is a side view of the magnetic latching mechanism of FIG. 2 in the second stable state. FIG. 11B and FIG. 11C are side views of the magnetic latching mechanism of FIG. 11A approaching the second stable state. Referring to FIG. 11A to FIG. 11C, similarly, since the pillar-shaped permanent magnet 122 has the N-pole and the S-pole, and the attraction forces between the pillar-shaped permanent magnet 122 and the first portion S1 and the second portion S2 are the strongest at places corresponding to the first distance d1 and the second distance d2 (an upper and a lower ends of the columnar hollow magnetic conductor 123), under a second stable state P2, the S-pole and the N-pole of the pillar-shaped permanent magnet 122 are respectively aligned to the second portion S2 and the first portion S1 of the columnar hollow magnetic conductor 123 at places corresponding to the second distance d2 and the first distance d1, so as to be in the fixed position, as shown in FIG. 11A. The columnar hollow magnetic conductor 123 may guide the pillar-shaped permanent magnet 122 to the above fixed position through the attraction force, so as to switch the magnetic latching mechanism 120 to the second table state P2. When the pillar-shaped permanent magnet 122 is not in the above fixed position as shown in FIG. 11B to result in a fact that the magnetic latching mechanism 120 is in the non-stable state, for example, a connection line of the N-pole and the S-pole of the pillar-shaped permanent magnet 122 is not coincided with the y-axis, the rotation shaft 110 and the pillar-shaped permanent magnet 122 attracted by the columnar hollow magnetic conductor 123 approach the fixed position shown in FIG. 11A anticlockwise to switch the magnetic latching mechanism 120 to the second table state P2. Similarly, when the pillar-shaped permanent magnet 122 is not in the above fixed position as shown in FIG. 11C to result in a fact that the magnetic latching mechanism 120 is in the non-stable state, the rotation shaft 110 and the pillar-shaped permanent magnet 122 attracted by the columnar hollow magnetic conductor 123 approach the fixed position shown in FIG. 11A clockwise to switch the magnetic latching mechanism 120 to the second table state P2.

Figure 12A:
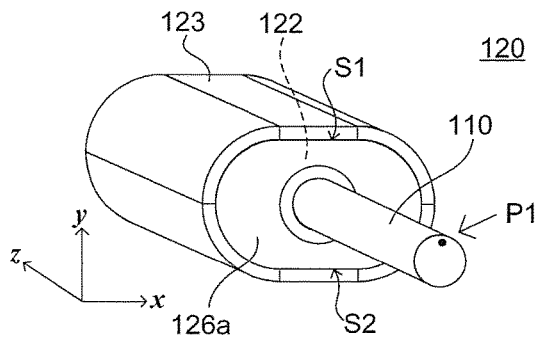
FIG. 12A and FIG. 12B are respectively schematic diagrams of a magnetic latching mechanism of FIG. 3 in the first stable state and the second stable state.
Figure 12B:
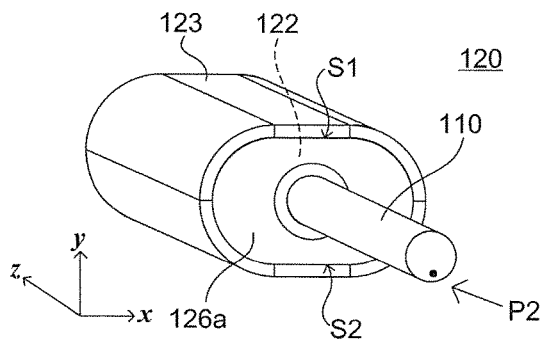

FIG. 12A and FIG. 12B are respectively schematic diagrams of the magnetic latching mechanism of FIG. 3 in the first stable state and the second stable state. Referring to FIG. 3, FIG. 10 and FIG. 11, as shown above, in the present embodiment, the magnetic latching mechanism 120 has two stable state, which are respectively the first stable state P1 shown in FIG. 10A and the second stable state P2 shown in FIG. 11A. If a black dot is configured on the rotation shaft 110 to represent a relative position of the pillar-shaped permanent magnet 122 and the rotation shaft 110, the black dot corresponding to the upper end of the columnar hollow magnetic conductor 123 shown in FIG. 12A may represent that the magnetic latching mechanism 120 is in the first stable state P1 (corresponding to FIG. 10A), and the black dot corresponding to the lower end of the columnar hollow magnetic conductor 123 shown in FIG. 12B may represent that the magnetic latching mechanism 120 is in the second stable state P2 (corresponding to FIG. 11A). Further, since the pillar-shaped permanent magnet 122 wraps the rotation shaft 110, when the columnar hollow magnetic conductor 123 guides the pillar-shaped permanent magnet 122 to the first stable state P1 or the second stable state P2 through the attraction force, the rotation shaft 110 and the pillar-shaped permanent magnet 122 rotate synchronously, such that the black dot on the rotation shaft 110 corresponds to the first portion S1 or the second portion S2 of the columnar hollow magnetic conductor 123, as shown in FIG. 12A or 12B.

Figure 13A:
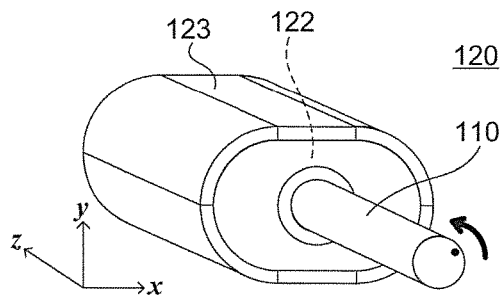
FIG. 13A and FIG. 13B are schematic diagrams of the magnetic latching mechanism of FIG. 12A approaching the first stable state.
Figure 13B:
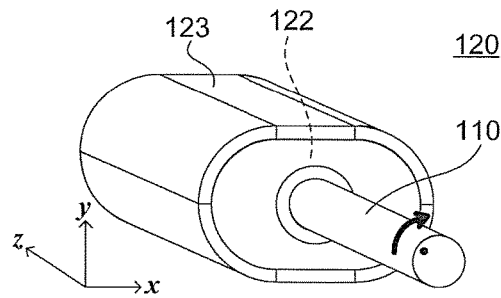
Figure 13C:
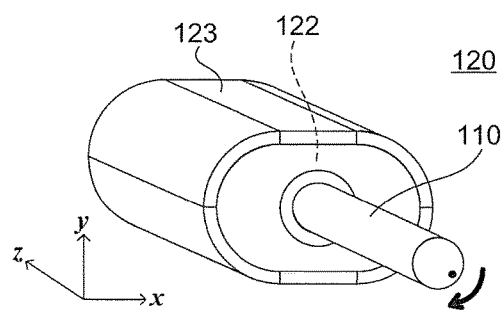
FIG. 13C and FIG. 13D are schematic diagrams of the magnetic latching mechanism of FIG. 12B approaching the second stable state.
Figure 13D:
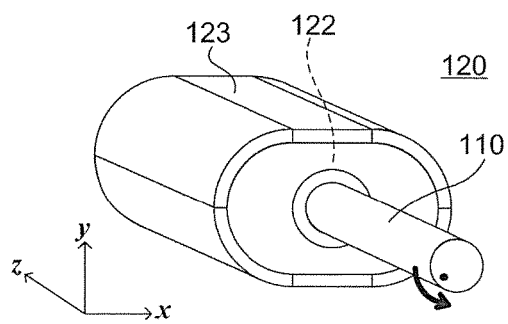

FIG. 13A and FIG. 13B are schematic diagrams of the magnetic latching mechanism of FIG. 12A approaching the first stable state. FIG. 13C and FIG. 13D are schematic diagrams of the magnetic latching mechanism of FIG. 12B approaching the second stable state. In the present embodiment, when the magnetic latching mechanism 120 is in the non-stable state shown in FIG. 13A, for example, when an initial position of the black dot at the front end of the rotation shaft 110 deviates from the y-axis, since the attraction force between the upper end of the columnar hollow magnetic conductor 123 and the pillar-shaped permanent magnet 122 is the strongest, the pillar-shaped permanent magnet 122 and the rotation shaft 110 approach the fixed position shown in FIG. 12A anticlockwise to switch the magnetic latching mechanism 120 to the first stable state P1. Similarly, when the magnetic latching mechanism 120 is in the non-stable state shown in FIG. 13B, for example, when the initial position of the black dot at the front end of the rotation shaft 110 deviates from the y-axis, the pillar-shaped permanent magnet 122 and the rotation shaft 110 approach the fixed position shown in FIG. 12A clockwise to switch the magnetic latching mechanism 120 to the first stable state P1. Moreover, when the magnetic latching mechanism 120 is in the non-stable state shown in FIG. 13C, for example, when the initial position of the black dot at the front end of the rotation shaft 110 deviates from the y-axis, the pillar-shaped permanent magnet 122 and the rotation shaft 110 approach the fixed position shown in FIG. 12B clockwise to switch the magnetic latching mechanism 120 to the second stable state P2. Similarly, when the magnetic latching mechanism 120 is in the non-stable state shown in FIG. 13D, for example, when the initial position of the black dot at the front end of the rotation shaft 110 deviates from the y-axis, the pillar-shaped permanent magnet 122 and the rotation shaft 110 approach the fixed position shown in FIG. 12B anticlockwise to switch the magnetic latching mechanism 120 to the second stable state P2.

According to the above descriptions related to the magnetic latching mechanism 120, it is known that when none external force or magnetic field is exerted, the pillar-shaped permanent magnet 122 can be guided by the columnar hollow magnetic conductor 123 to stay in the fixed position, for example, the S-pole and the N-pole of the pillar-shaped permanent magnet 122 are respectively aligned to the first portion S1 and the second portion S2 of the columnar hollow magnetic conductor 123 at places corresponding to the first distance d1 and the second distance d2, or the S-pole and the N-pole of the pillar-shaped permanent magnet 122 are respectively aligned to the second portion S2 and the first portion S1 of the columnar hollow magnetic conductor 123 at places corresponding to the second distance d2 and the first distance d1, so as to make the magnetic latching mechanism 120 to be in the first stable state P1 or the second stable state P2. In other words, in the magnetic latching mechanism 120, by designing the columnar hollow magnetic conductor 123 in a flat shape, the first portion S1 and the second portion S2 of the columnar hollow magnetic conductor 123 respectively have the shortest first distance d1 and second distance d2 relative to the pillar-shaped permanent magnet 122, such that the columnar hollow magnetic conductor 123 may guide the N-pole and the S-pole of the pillar-shaped permanent magnet 122 to approach the first portion S1 and the second portion S2 at places corresponding to the first distance d1 and the second distance d2, so as to switch the magnetic latching mechanism 120 to the first stable state P1 or the second stable state P2, and strengthen stableness of the magnetic latching mechanism 120 in the stable state.

Figure 14A:
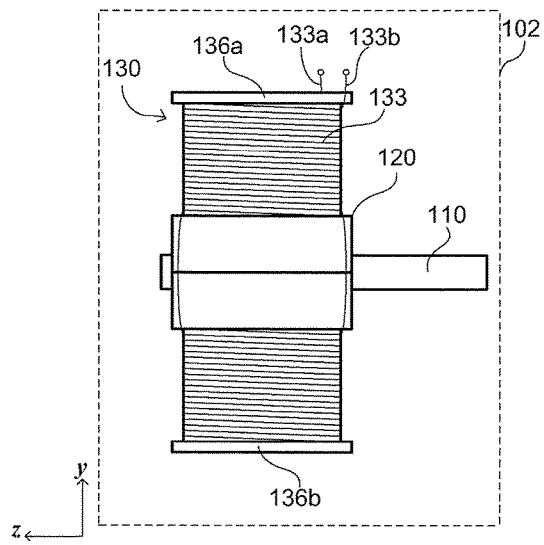
FIG. 14A and FIG. 14B are respectively a side view and a front view of the bistable actuator of FIG. 1.
Figure 14B:
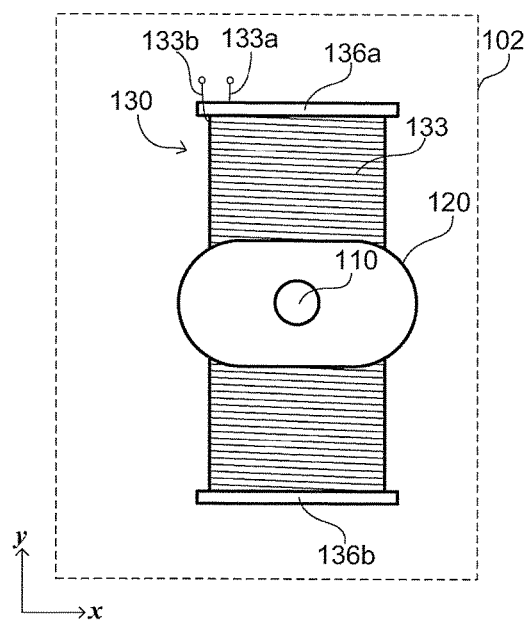
Figure 15A:
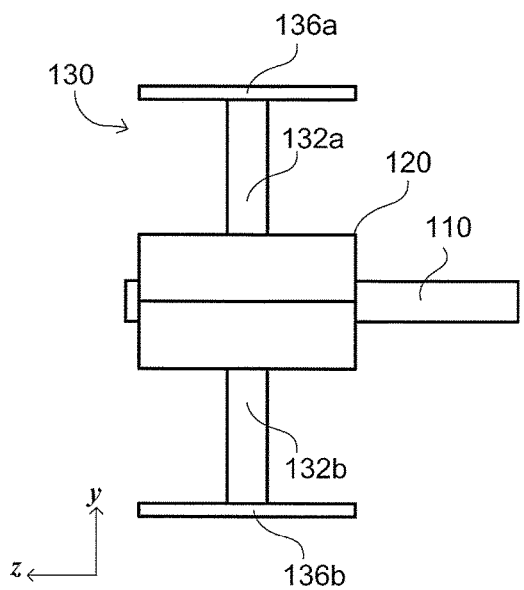
FIG. 15A and FIG. 15B are respectively a side view and a front view of a magnetic latching mechanism and a part of an electromagnet of FIG. 14A and FIG. 14B.
Figure 15B:
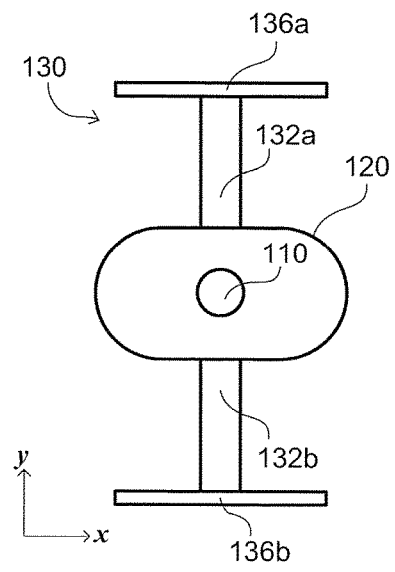

FIG. 14A and FIG. 14B are respectively a side view and a front view of the bistable actuator of FIG. 1. FIG. 15A and FIG. 15B are respectively a side view and a front view of a magnetic latching mechanism and a part of an electromagnet of FIG. 14A and FIG. 14B. Referring to FIG. 14A to FIG. 15B, in the present embodiment, the bistable actuator 102 is composed of an electromagnet 130 and the aforementioned rotation shaft 110 and the magnetic latching mechanism 120. The electromagnet 130 includes two columnar magnetic conductive materials 132a and 132b, a coil 133 and two first magnetic guiding components 136a and 136b, where the coil 133 shown in FIG. 14A and FIG. 14B is omitted in FIG. 15A and FIG. 15B in order to clearly demonstrate positions and structures of the columnar magnetic conductive materials 132a and 132b. The columnar magnetic conductive materials 132a and 132b of the electromagnet 130 are, for example, rod-like magnetic conductive materials, and are respectively connected to the upper end and the lower end of the columnar hollow magnetic conductor 123 (shown in the above drawings) of the magnetic latching mechanism 120. The two first magnetic guiding components 136a and 136b are respectively located on the two columnar magnetic conductive materials 132a and 132b, and are respectively connected to the two columnar magnetic conductive materials 132a and 132b. The coil 133 is winded on the two columnar magnetic conductive materials 132a and 132b, and two currents of different directions are introduced to the coil 133 of the electromagnet 130 from two terminals 133a and 133b to generate two magnetic fields in opposite directions for functioning on the pillar-shaped permanent magnet 122. When the magnetic fields are generated between the coil 133 and the columnar magnetic conductive materials 132a and 132b, the first magnetic guiding components 136a and 136b guide the two magnetic fields, and the columnar hollow magnetic conductor 123 (shown in FIG. 12A and FIG. 12B) generates a magnetic attraction force or a magnetic repulsion force relative to the pillar-shaped permanent magnet 122, where the pillar-shaped permanent magnet 122 is rotated relative to the columnar hollow magnetic conductor 123 through the magnetic attraction force or the magnetic repulsion force, and drives the rotation shaft 110 to rotate clockwise or anticlockwise along the z-axis, so as to switch the magnetic latching mechanism 120 from the first stable state P1 shown in FIG. 12A to the second stable state P2 shown in FIG. 12B, or from the second stable state P2 shown in FIG. 12B to the first stable state P1 shown in FIG. 12A.

Figure 16A:
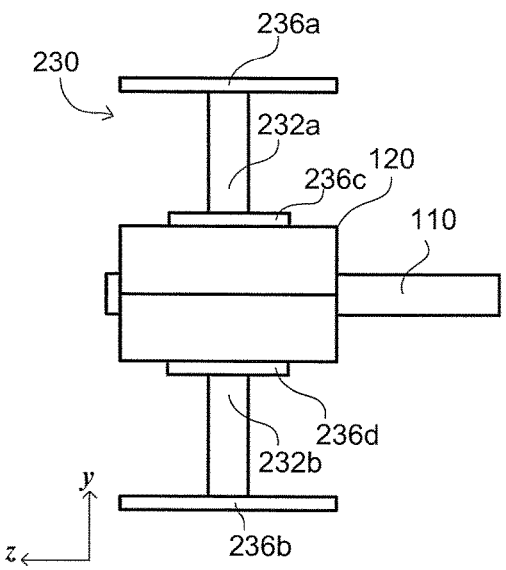
FIG. 16A and FIG. 16B are respectively a side view and a front view of a magnetic latching mechanism and a part of an electromagnet according to another embodiment of the invention.
Figure 16B:
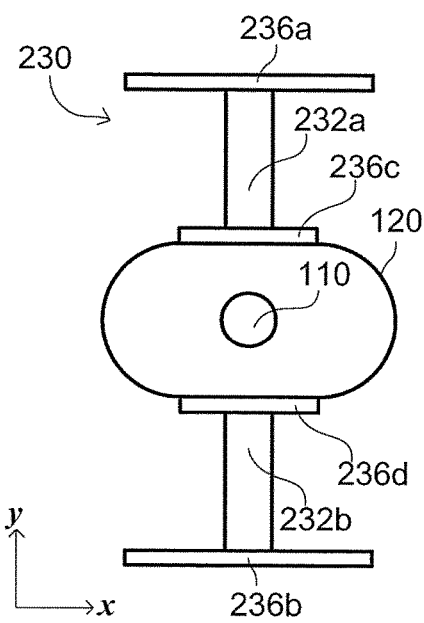

FIG. 16A and FIG. 16B are respectively a side view and a front view of a magnetic latching mechanism and a part of an electromagnet according to another embodiment of the invention. Referring to FIG. 16A to FIG. 16B, in the present embodiment, positions and structures of the columnar magnetic conductive materials 232a and 232b of the electromagnet 230 are similar to that of the columnar magnetic conductive materials 132a and 132b of the electromagnet 130 shown in FIG. 15A and FIG. 15B, where the coil 133 shown in FIG. 14A and FIG. 14B is omitted in FIG. 16A and FIG. 16B in order to clearly demonstrate positions and structures of the columnar magnetic conductive materials 232a and 232b. A main difference between the electromagnet 230 of the present embodiment and the aforementioned electromagnet 130 is that the electromagnet 230 includes four first magnetic guiding components 236a-236d. The first magnetic guiding components 236a and 236b of the present embodiment are similar to the aforementioned first magnetic guiding components 136a and 136b, and are respectively connected to the two columnar magnetic conductive materials 232a and 232b. Moreover, the first magnetic guiding component 236c of the present embodiment is located between the magnetic latching mechanism 120 and the columnar magnetic conductive material 232a, and the first magnetic guiding component 236d is located between the magnetic latching mechanism 120 and the columnar magnetic conductive material 232b. Therefore, the first magnetic guiding components 236a-236d are used for guiding the magnetic fields generated between the coil 133 and the columnar magnetic conductive materials 232a and 232b, so as to switch the magnetic latching mechanism 130 to the stable state. The amount and positions of the first magnetic guiding components are not limited by the invention.

Figure 17:
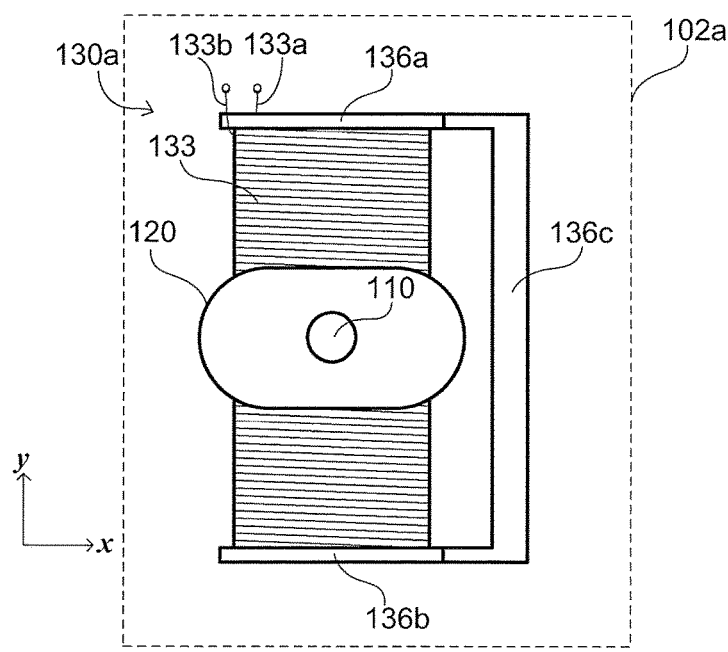
FIG. 17 and FIG. 18 are front views of a bistable actuator according to another embodiment of the invention.
Figure 18:
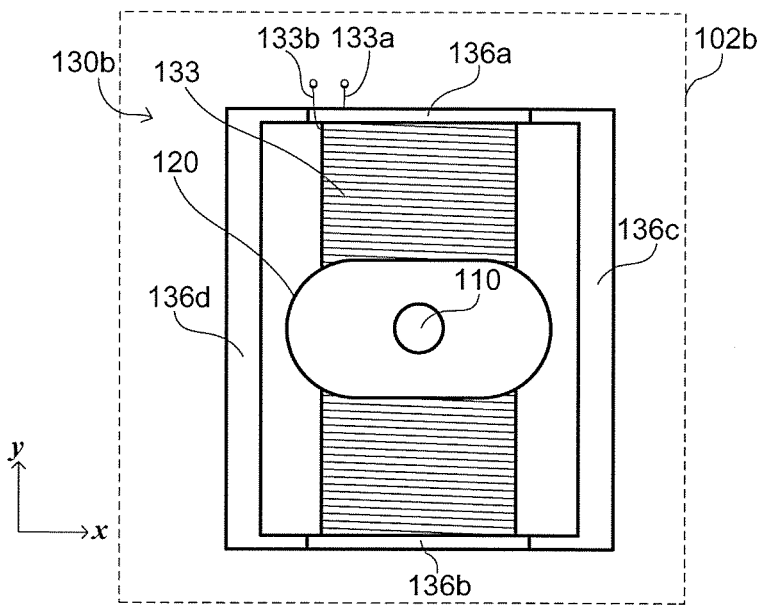

FIG. 17 and FIG. 18 are front views of a bistable actuator according to another embodiment of the invention. Referring to FIG. 17, in the present embodiment a main difference between the bistable actuator 102*a* and the bistable actuator 102 of FIG. 14B is that the electromagnet 130*a* of the bistable actuator 102*a* further includes a second magnetic guiding component 136*c*. One end of the magnetic field of the electromagnet 130 of FIG. 14B is a magnetic path generated through air conduction, which has a problem of high magnetic reluctance. Therefore, in the present embodiment, the second magnetic guiding component 136*c* is configured to connect the two first magnetic guiding components 136*a* and 136*b*, and since a magnetic conductive coefficient of the second magnetic guiding component 136*c* is far higher than a magnetic conductive coefficient of the air, by configuring the second magnetic guiding component 136*c*, a total magnetic reluctance of the magnetic field of the electromagnet 130*a* is greatly decreased. In this way, the second magnetic guiding component 136*c* is configured to increase an electromagnetic efficiency of the electromagnet 130*a*, so as to decrease an electric energy transition driving force required by the electromagnet 130*a* for driving the magnetic latching mechanism 120 to switch the stable state. Similarly, in the embodiment of FIG. 18, a main difference between the bistable actuator 102*b* and the bistable actuator 102 of FIG. 14B and the bistable actuator 102*a* of FIG. 17 is that the electromagnet 130*b* of the bistable actuator 102*b* further includes two second magnetic guiding components 136*c* and 136*d*. The second magnetic guiding components 136*c* and 136*d* are respectively connected to the two first magnetic guiding components 136*a* and 136*b*, and are also used for increasing the electromagnetic efficiency of the electromagnet 130*b*, so as to decrease an electric energy transition driving force required by the electromagnet 130*b* for driving the magnetic latching mechanism 120 to switch the stable state. Therefore, the amount and configuration positions of the second magnetic guiding components are not limited by the invention.

Figure 19A:
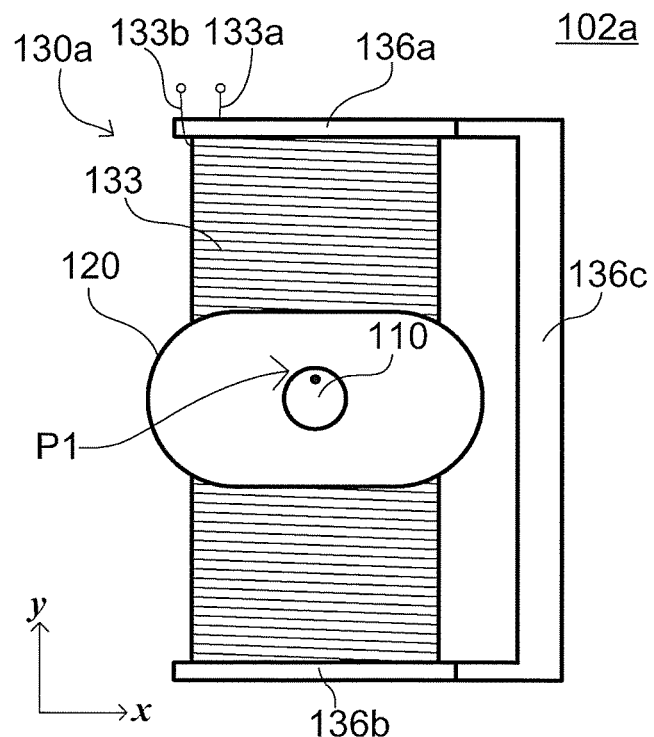
FIG. 19A and FIG. 19B are respectively front views of the bistable actuator of FIG. 17 in the first stable state and the second stable state.
Figure 19B:
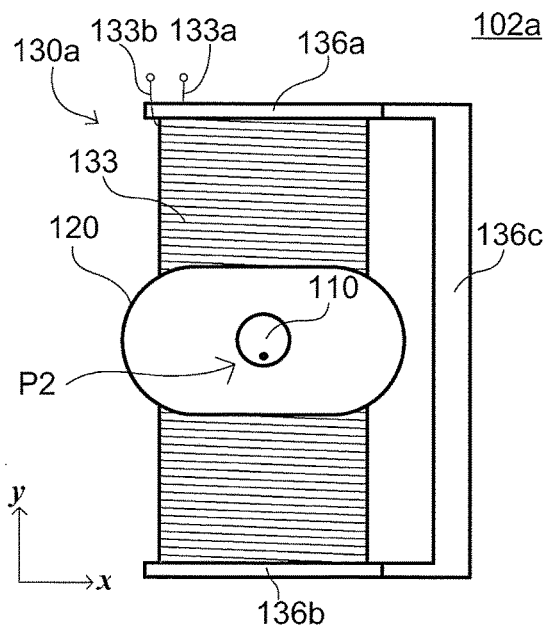

FIG. 19A and FIG. 19B are respectively front views of the bistable actuator of FIG. 17 in the first stable state and the second stable state. Referring to FIG. 19A and FIG. 19B, in the present embodiment, if a black dot is configured on the rotation shaft 110 to represent a relative position of the rotation shaft 110 and the magnetic latching mechanism 120, the black dot corresponding to the upper end of the magnetic latching mechanism 120 shown in FIG. 19A may represent that the magnetic latching mechanism 120 is in the first stable state P1 (corresponding to FIG. 10A and FIG. 12A), and the black dot corresponding to the lower end of the magnetic latching mechanism 120 shown in FIG. 19B may represent that the magnetic latching mechanism 120 is in the second stable state P2 (corresponding to FIG. 11A and FIG. 12B). As described above, the coil 133 may generate two magnetic fields in opposite directions by introducing two currents of different directions to the coil 133 of the electromagnet 130 from the two terminals 133*a* and 133*b*, and the first magnetic guiding components 136*a* and 136*b* may guide the two magnetic fields to make the columnar hollow magnetic conductor 123 (shown in FIG. 12A and FIG. 12B) of the magnetic latching mechanism 120 to generate a magnetic attraction force or a magnetic repulsion force relative to the pillar-shaped permanent magnet 122, so as to switch the stable state of the magnetic latching mechanism 120, for example, to switch the magnetic latching mechanism 120 from the first stable state P1 shown in FIG. 19A to the second stable state P2 shown in FIG. 19B, or switch the magnetic latching mechanism 120 from the second stable state P2 shown in FIG. 19B to the first stable state P1 shown in FIG. 19A.

Figure 20A:
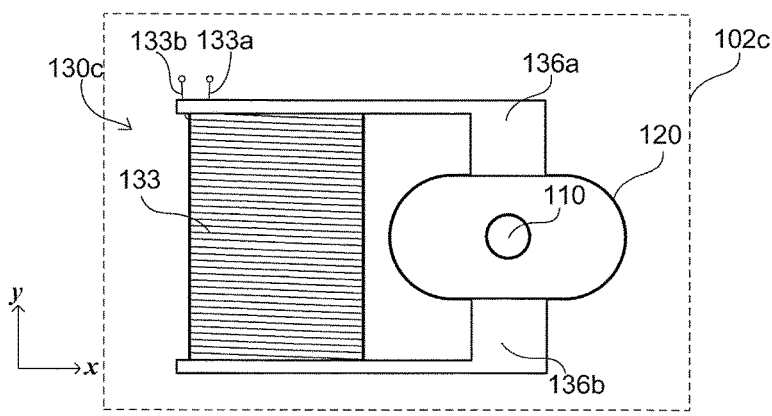
FIG. 20A to FIG. 20D are respectively a front view of a bistable actuator, a front view of a magnetic latching mechanism and a part of an electromagnet, and front views of the bistable actuator in the first stable state and the second stable state according to another embodiment of the invention.
Figure 20B:
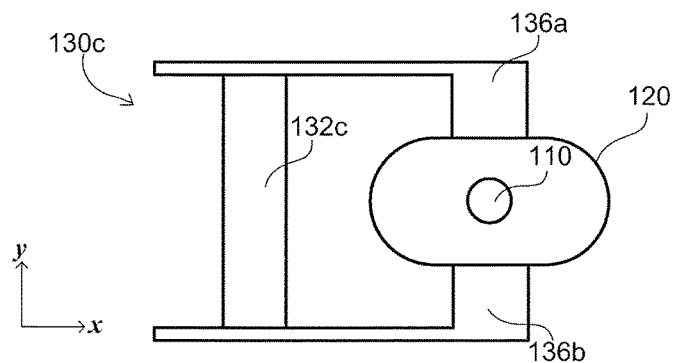
Figure 20C:
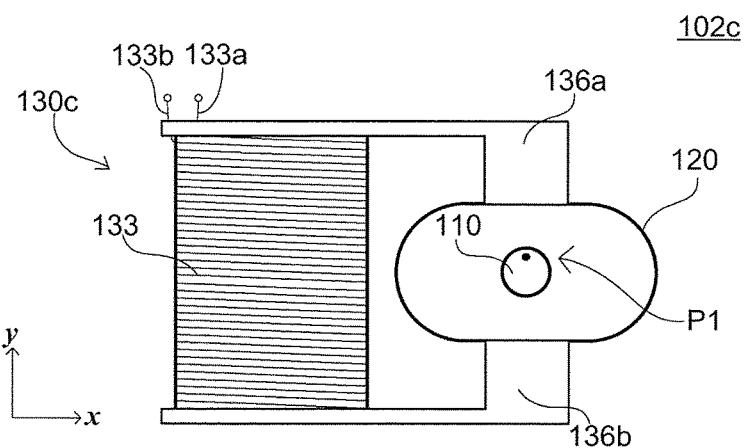
Figure 20D:
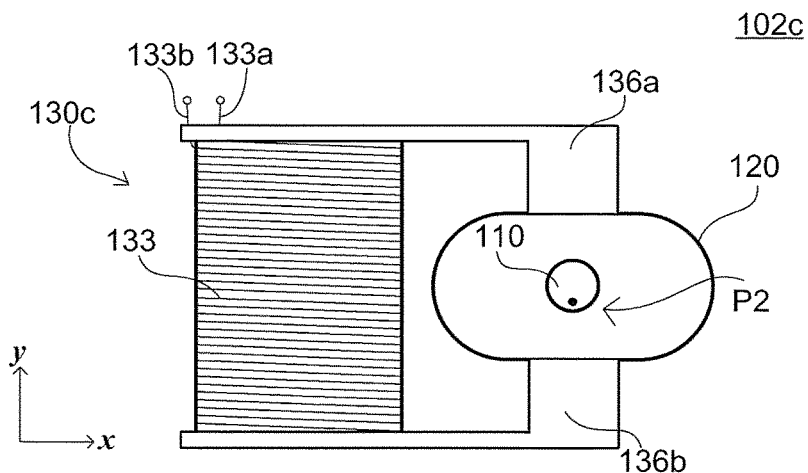

FIG. 20A to FIG. 20D are respectively a front view of a bistable actuator, a front view of a magnetic latching mechanism and a part of an electromagnet, and front views of the bistable actuator in the first stable state and the second stable state according to another embodiment of the invention. Referring to FIG. 20A and FIG. 20B, in the present embodiment, a main difference between the bistable actuator 102*c* and the bistable actuator 102 of FIG. 14B is that the electromagnet 130*c* of the bistable actuator 102*c* only has one columnar magnetic conductive material 132*c*, where the columnar magnetic conductive material 132*c* is located at one side of the magnetic latching mechanism 120, and the two first magnetic guiding components 136*a* and 136*b* are disposed on the magnetic latching mechanism 120. In detail, the columnar magnetic conductive material 132*c* is located at one side of the magnetic latching mechanism 120, and is connected to the upper and lower ends of the magnetic latching mechanism 120 through the two first magnetic guiding components 136*a* and 136*b* disposed on the magnetic latching mechanism 120. The two first magnetic guiding components 136*a* and 136*b* are respectively connected to two ends of the columnar magnetic conductive material 132*c*. The coil 133 is winded on the columnar magnetic conductive material 132*c*, and a current is introduced through the two terminals 133*a* and 133*b* to generate a magnetic field. The first magnetic guiding components 136*a* and 136*b* guide the magnetic field to make the magnetic latching mechanism 120 to switch the stable state. Referring to FIG. 20C and FIG. 20D, in the present embodiment, if a black dot is configured on the rotation shaft 110 to represent a relative position of the rotation shaft 110 and the magnetic latching mechanism 120, the black dot corresponding to the upper end of the magnetic latching mechanism 120 shown in FIG. 20C may represent that the magnetic latching mechanism 120 is in the first stable state P1, and the black dot corresponding to the lower end of the magnetic latching mechanism 120 shown in FIG. 20D may represent that the magnetic latching mechanism 120 is in the second stable state P2. As described above, the coil 133 may generate a magnetic field by introducing two currents from the two terminals 133*a* and 133*b*, and the first magnetic guiding components 136*a* and 136*b* may guide the magnetic field to switch the stable state of the magnetic latching mechanism 120, for example, to switch the magnetic latching mechanism 120 from the first stable state P1 shown in FIG. 20C to the second stable state P2 shown in FIG. 20D, or switch the magnetic latching mechanism 120 from the second stable state P2 shown in FIG. 20D to the first stable state P1 shown in FIG. 20C.

Figure 21A:
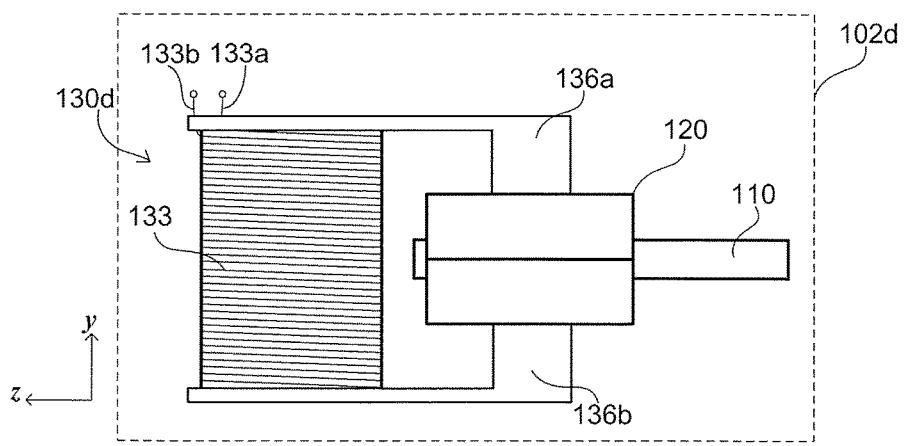
FIG. 21A to FIG. 21D are respectively a side view of a bistable actuator, a side view of a magnetic latching mechanism and a part of an electromagnet, and side views of the bistable actuator in the first stable state and the second stable state according to another embodiment of the invention.
Figure 21B:
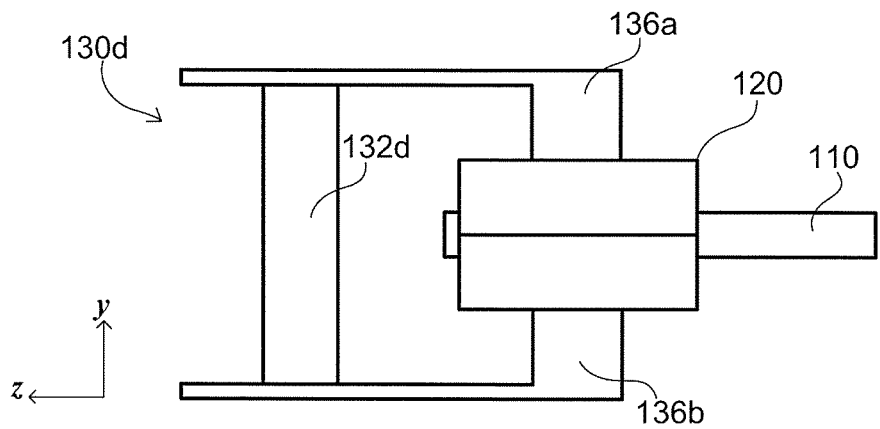
Figure 21C:
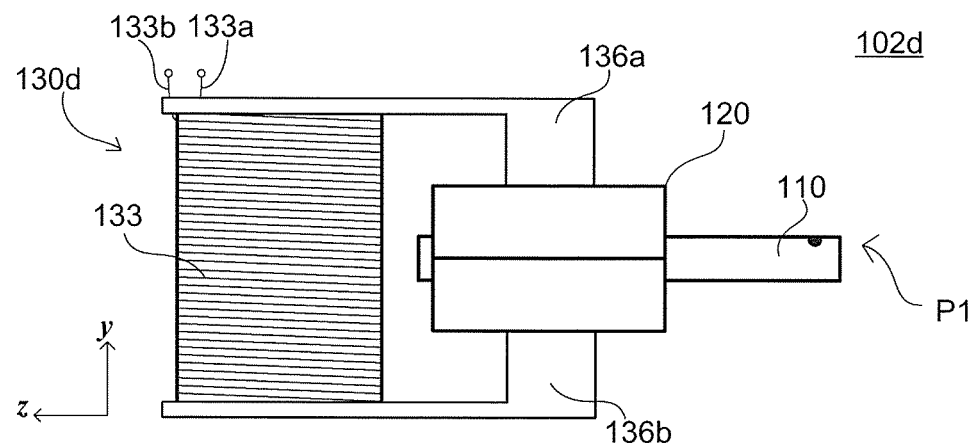
Figure 21D:
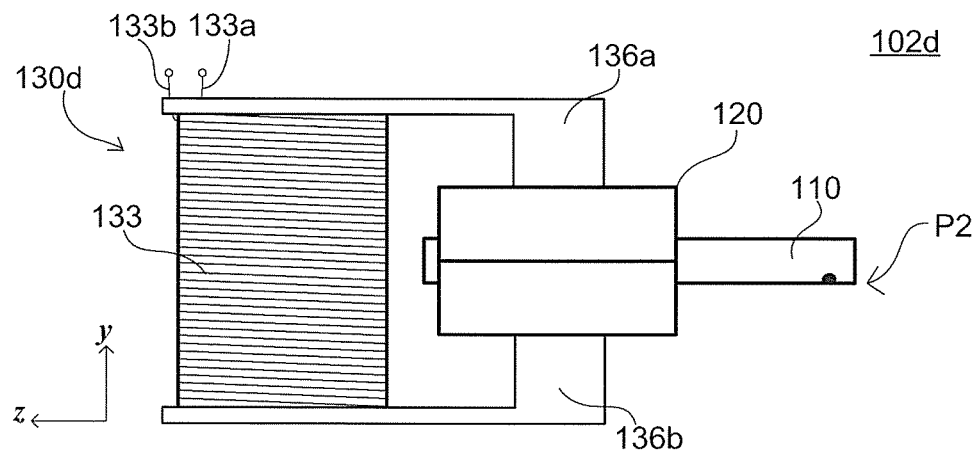

FIG. 21A to FIG. 21D are respectively a side view of a bistable actuator, a side view of a magnetic latching mechanism and a part of an electromagnet, and side views of the bistable actuator in the first stable state and the second stable state according to another embodiment of the invention. Referring to FIG. 21A and FIG. 21B, in the present embodiment, a main difference between the bistable actuator 102*d* and the bistable actuator 102 of FIG. 14B is that the electromagnet 130*d* of the bistable actuator 102*d* only has one columnar magnetic conductive material 132*d*, where the columnar magnetic conductive material 132*d* is located at a back side of the magnetic latching mechanism 120, and the two first magnetic guiding components 136*a* and 136*b* are disposed on the magnetic latching mechanism 120. In detail, the columnar magnetic conductive material 132d is located at the back side of the magnetic latching mechanism 120, and is connected to the upper and lower ends of the magnetic latching mechanism 120 through the two first magnetic guiding components 136a and 136b disposed on the magnetic latching mechanism 120. The two first magnetic guiding components 136a and 136b are respectively connected to two ends of the columnar magnetic conductive material 132d. The coil 133 is winded on the columnar magnetic conductive material 132d, and currents are introduced through the two terminals 133a and 133b to generate a magnetic field. The first magnetic guiding components 136a and 136b guide the magnetic field to make the magnetic latching mechanism 120 to switch the stable state. Referring to FIG. 21C and FIG. 21D, in the present embodiment, if a black dot is configured on the rotation shaft 110 to represent a relative position of the rotation shaft 110 and the magnetic latching mechanism 120, the black dot corresponding to the upper end of the magnetic latching mechanism 120 shown in FIG. 21C may represent that the magnetic latching mechanism 120 is in the first stable state P1, and the black dot corresponding to the lower end of the magnetic latching mechanism 120 shown in FIG. 21D may represent that the magnetic latching mechanism 120 is in the second stable state P2. As described above, the coil 133 may generate a magnetic field by introducing two currents from the two terminals 133a and 133b, and the first magnetic guiding components 136a and 136b may guide the magnetic field to switch the stable state of the magnetic latching mechanism 120, for example, to switch the magnetic latching mechanism 120 from the first stable state P1 shown in FIG. 21C to the second stable state P2 shown in FIG. 21D, or switch the magnetic latching mechanism 120 from the second stable state P2 shown in FIG. 21D to the first stable state P1 shown in FIG. 21C. Moreover, the aforementioned bistable actuators 102 and 102b also have the characteristic of switching the stable states, and a process thereof may refer to related descriptions of the bistable actuators 102a, 102c and 102d, which are not repeated.

According to the aforementioned various variations, in the bistable relay of the invention, composition of the electromagnet in the bistable actuator can be adjusted according to actual requirement, for example, the amounts and positions of the columnar magnetic conductive materials and the first magnetic guiding components can be adjusted, and the second magnetic guiding components can be selectively configured according to an actual requirement, so that when the two currents of different direction are introduced to the coil 133 to generate the magnetic fields with different magnetic properties, the magnetic latching mechanism 120 may switch the stable states. Since the magnetic latching mechanism 120 in the bistable relay has two stable states (the first stable state P1 and the second stable state P2), and during the process of switching the stable states, the pillar-shaped permanent magnet 122 of the magnetic latching mechanism 120 may drive the rotation shaft 110 wrapped by the pillar-shaped permanent magnet 122 to rotate synchronously. Therefore, the bistable actuator of the invention may have good magnetic latching efficiency through the attraction force between the columnar hollow magnetic conductor and the pillar-shaped permanent magnet, so as to strengthen the stableness of the bistable relay in the stable state, and increase the electromagnetic transition efficiency of the electromagnet through the first magnetic guiding components and the second magnetic guiding components, and decrease the electric energy requirement in stable state switching of the magnetic latching mechanism.

Figure 22A:
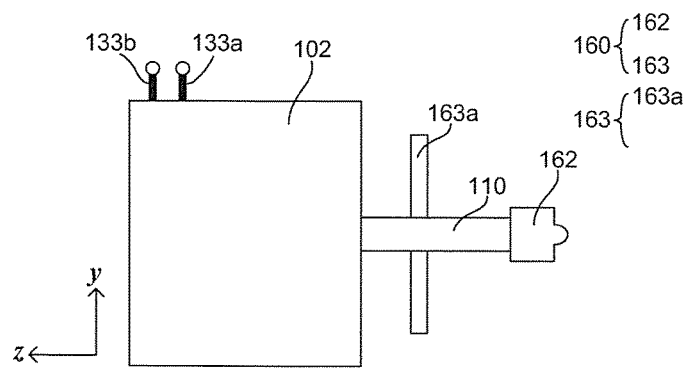
FIG. 22A to FIG. 22C are respectively a combination diagram of the bistable actuator and a part of an impact system of FIG. 1 and schematic diagrams of the bistable actuator in the first stable state and the second stable state.
Figure 22B:
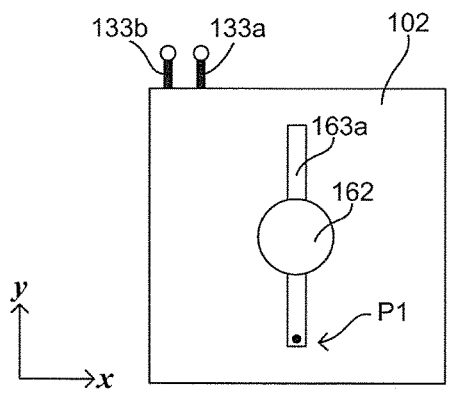
Figure 22C:
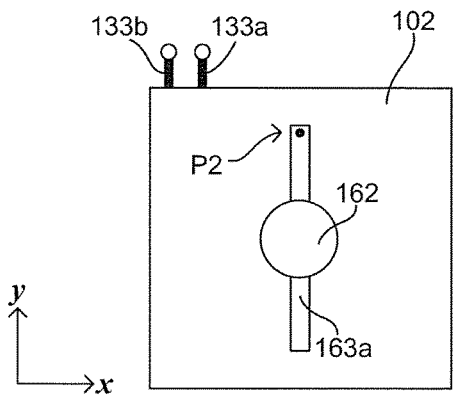
Figure 23:
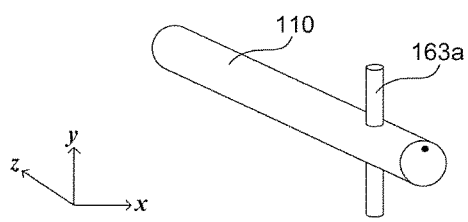
FIG. 23 is a schematic diagram of a combination of a tenon and a rotation shaft of FIG. 22A.

FIG. 22A to FIG. 22C are respectively a combination diagram of the bistable actuator and a part of the impact system of FIG. 1 and schematic diagrams of the bistable actuator in the first stable state and the second stable state. FIG. 23 is a schematic diagram of a combination of a tenon and a rotation shaft of FIG. 22A. Referring to FIG. 22A and FIG. 23, in the present embodiment, the impact system 160 (shown in FIG. 1) is connected to the rotation shaft 110 of the bistable actuator 102, where the impact system 160 includes a striking head 162 and a moving track guider 163. The striking head 162 is disposed at one end of the rotation shaft 110 (for example, a front end of the rotation shaft 110). A material of the striking head 162 is an electrical insulating material. Therefore, in other embodiments, if the rotation shaft 110 itself adopts the electrical insulating material, the impact system 160 may omit the striking head 162, and the front end of the rotation shaft 110 can be directly used to replace the striking head 162. The moving track guider 163 is connected to the rotation shaft 110. The moving track guider 163 includes a tenon 163a, which is vertically disposed on the rotation shaft 110 and penetrates through the rotation shaft 110, as shown in FIG. 23. The tenon 163a is located between the striking head 162 and the bistable actuator 102, and when the magnetic latching mechanism 120 in the bistable actuator 102 switches the stable states through the electromagnet 130 and drives the rotation shaft 110 to rotate synchronously, the tenon 163a also rotates synchronously along with the rotation shaft 110. Similarly, in the present embodiment, if a black dot is configured on the tenon 163a to represent a relative position of the rotation shaft 110, the black dot rotated to a lower position of the rotation shaft 110 as shown in FIG. 22B may represent that the magnetic latching mechanism 120 is in the first stable state P1, and the black dot rotated to an upper position of the rotation shaft 110 as shown in FIG. 22C may represent that the magnetic latching mechanism 120 is in the second stable state P2. Through the magnetic field generated by the electromagnet 130, the rotation shaft 110 and the tenon 163a may move along with switching of the stable states of the magnetic latching mechanism 120, for example, from the stable state shown in FIG. 22B to the stable state shown in FIG. 22C, or from the stable state shown in FIG. 22C to the stable state shown in FIG. 22B.

Figure 24A:
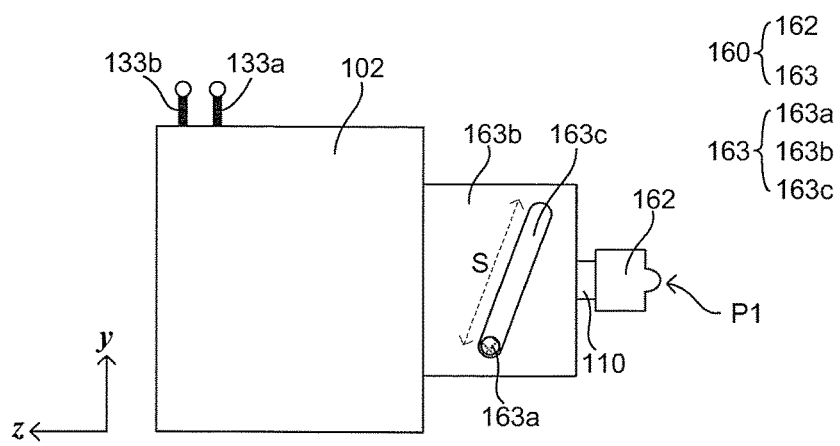
FIG. 24A and FIG. 24B are respectively a side view and a front view of the bistable actuator and the impact system of FIG. 1 in the first stable state.
Figure 24B:
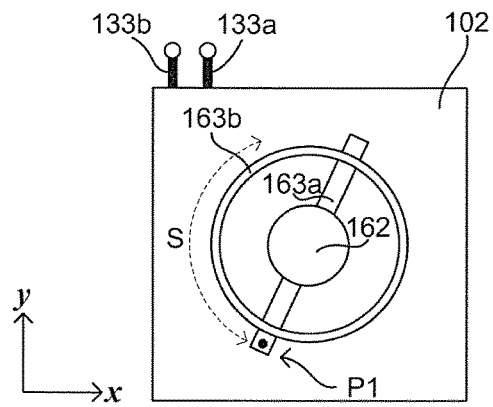
Figure 25A:
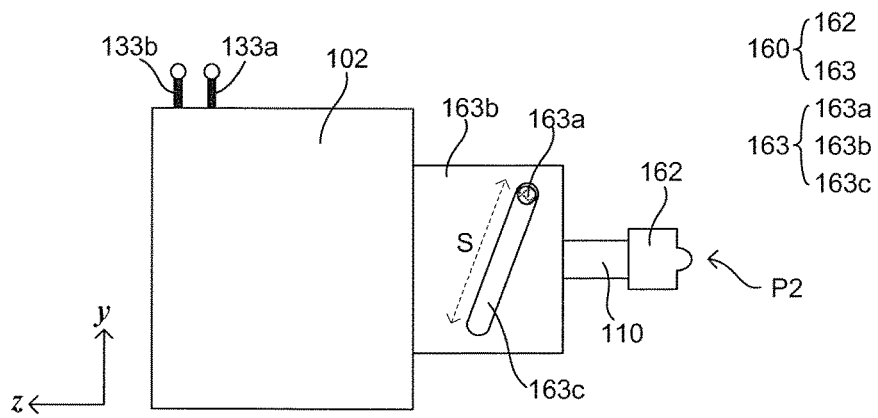
FIG. 25A and FIG. 25B are respectively a side view and a front view of the bistable actuator and the impact system of FIG. 1 in the second stable state.
Figure 25B:
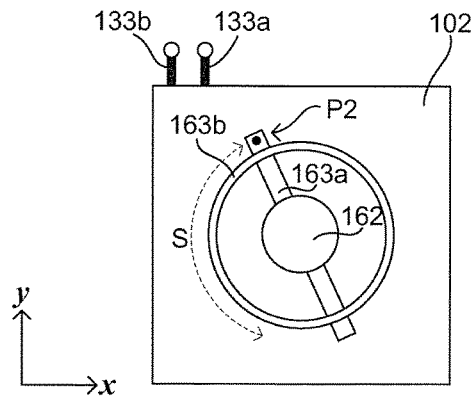
Figure 26:
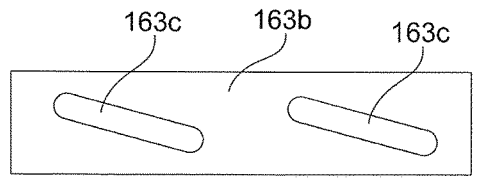
FIG. 26 is an expansion view of a columnar sleeve of FIG. 24A to FIG. 25B.

FIG. 24A and FIG. 24B are respectively a side view and a front view of the bistable actuator and the impact system of FIG. 1 in the first stable state. FIG. 25A and FIG. 25B are respectively a side view and a front view of the bistable actuator and the impact system of FIG. 1 in the second stable state. FIG. 26 is an expansion view of a columnar sleeve of FIG. 24A to FIG. 25B. Referring to FIG. 24A to FIG. 26, in the present embodiment, the moving track guider 163 further includes a columnar sleeve 163b. The columnar sleeve 163b encircles a part of the rotation shaft 110 and the tenon 163a. The columnar sleeve 163b has an opening 163c for providing a moving track S. The tenon 163a is located in the opening 163c, and moves along the moving track S. A position of the opening 163c may refer to FIG. 26, and since the tenon 163a vertically penetrates through the rotation shaft 110, and both ends of the tenon 163a stretch out of the rotation shaft 110, the two ends of the tenon 163a are adapted to move through the corresponding opening 163c. Moreover, in the present embodiment, a plane including the moving track S formed by the opening 163c is not parallel to an xy-plane in FIG. 24B or FIG. 25B, or is inclined forward relative to the y-axis with reference of the xy-plane.

Therefore, the tenon 163a and the columnar sleeve 163b of the moving track guider 163 are adapted to transform a rotation force of the rotation shaft 110 rotated along a radial tangent into a displacement force along an axial direction, for example, when the rotation shaft 110 rotates along the z-axis, the rotation shaft 110 is guided to move along the z-axis, where the tenon 163a connected to the rotation shaft 110 moves in the opening 163c along the moving track S, and during a process that the tenon 163a rotates synchronously along with the rotation shaft 110, the tenon 163a also moves back and forth along the z-axis, so as to drive the rotation shaft 110 to move back and forth along the z-axis.

The position of the tenon 163a of FIG. 24A and the position of the black dot of the tenon 163a of FIG. 24B are assumed to correspond to the first stable state P1, and the position of the tenon 163a of FIG. 25A and the position of the black dot of the tenon 163a of FIG. 25B are assumed to correspond to the second stable state P2. Referring to FIG. 24A to FIG. 24B, in the present embodiment, the bistable actuator 102 may switch the rotation shaft 110 from the first stable state P1 to the second stable state P2, i.e. the black dot on the tenon 163a of FIG. 24B is rotated clockwise from bottom to top to the position shown in FIG. 25B, by introducing a first polarity voltage or an equivalent current to the electromagnet 130. Thereafter, even if the first polarity voltage or the equivalent current applied to the electromagnet 130 is cut off or stopped, the black dot of the tenon 163a is still stably fixed to the position shown in FIG. 25B. In FIG. 25B, although the position of the black dot on the tenon 163a represents that the magnetic latching mechanism 120 is not in the stable state shown in FIG. 22C, the magnetic latching mechanism 120 still has a magnetic attraction force or a magnetic repulsion force for driving the rotation shaft 110 to drive the tenon 163a to rotate clockwise to the position shown in FIG. 22C. Therefore, the rotation shaft 110 can be fixed to the position shown in FIG. 25B through a limitation between the opening 163c of the columnar sleeve 163b and the tenon 163a. In other words, after the magnetic latching mechanism 120 switches the stable states through the magnetic field of the electromagnet 130, the magnetic latching mechanism 120 may further strengthen the stableness of the rotation shaft 110 in the fixed location through the magnetic attraction force or the magnetic repulsion force.

Similarly, referring to FIG. 25A and FIG. 25B, the bistable actuator 102 may switch the rotation shaft 110 from the second stable state P2 to the first stable state P1, i.e. the black dot on the tenon 163a of FIG. 25B is rotated anti-clockwise from top to bottom to the position shown in FIG. 24B, by introducing a second polarity voltage or an equivalent current to the electromagnet 130. Thereafter, even if the second polarity voltage or the equivalent current applied to the electromagnet 130 is cut off or stopped, the black dot of the tenon 163a is still stably fixed to the position shown in FIG. 24B. In FIG. 24B, although the position of the black dot on the tenon 163a represents that the magnetic latching mechanism 120 is not in the stable state shown in FIG. 22B, the magnetic latching mechanism 120 still has a magnetic attraction force or a magnetic repulsion force for driving the rotation shaft 110 to drive the tenon 163a to rotate anti-clockwise to the position shown in FIG. 22B. Therefore, the rotation shaft 110 can be fixed to the position shown in FIG. 24B through a limitation between the opening 163c of the columnar sleeve 163b and the tenon 163a. In other words, after the magnetic latching mechanism 120 switches the stable states through the magnetic field of the electromagnet 130, the magnetic latching mechanism 120 may further strengthen the stableness of the rotation shaft 110 in the fixed location through the magnetic attraction force or the magnetic repulsion force.

During a rotation process of the rotation shaft 110 and the tenon 163a, the columnar sleeve 163b provides the moving track S, so as to transform a rotation force of the rotation shaft 110 rotated along the z-axis into a displacement force of the rotation shaft 110 moved back and forth along the z-axis. Therefore, when the rotation shaft 110 is switched between the first stable state P1 and the second stable state P2 through the magnetic latching mechanism 120 and the electromagnet 130 in the bistable actuator 102, the striking head 162 on the rotation shaft 110 is rotated synchronously along with the rotation shaft 110, and may stretch out along the z-axis as shown in FIG. 25A or draw back along the z-axis as shown in FIG. 24A. At this time, by configuring the contact system 150 (shown in FIG. 1) on the striking head 162 of the impact system 160, the striking head 162 may move relative to the contact system 150 along the axial direction to approach or depart from the contact system 150, such that the contact system 150 is connected or cut off as the striking head stretches out or draws back along the axial direction.

Figure 27A:
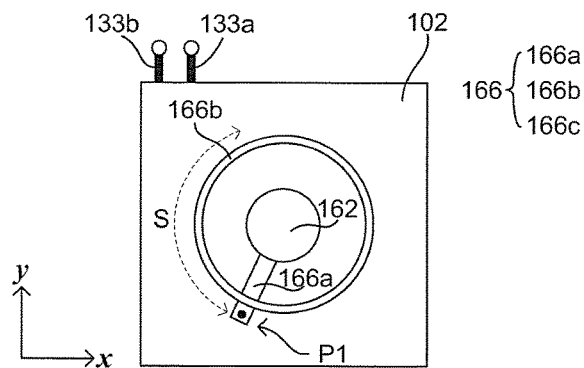
FIG. 27A and FIG. 27B are respectively front views of a bistable actuator and an impact system in the first stable state and the second stable state according to another embodiment of the invention.
Figure 27B:
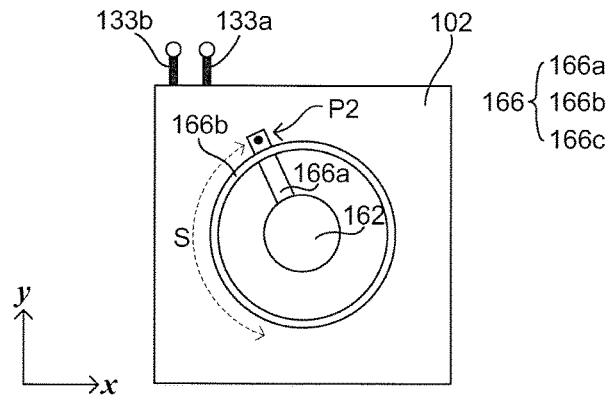
Figure 28:
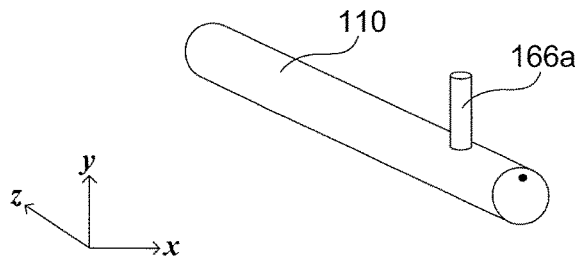
FIG. 28 is a schematic diagram of a combination of a tenon and a rotation shaft of FIG. 27A and FIG. 27B.
Figure 29:
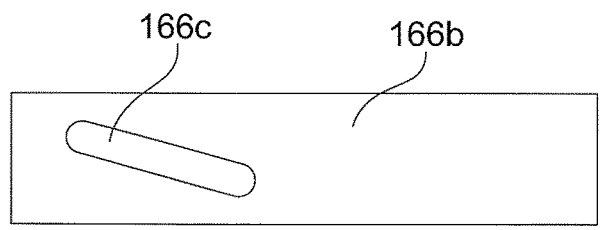
FIG. 29 is an expansion view of a columnar sleeve of FIG. 27A to FIG. 27B.

FIG. 27A and FIG. 27B are respectively front views of a bistable actuator and an impact system in the first stable state and the second stable state according to another embodiment of the invention. FIG. 28 is a schematic diagram of a combination of a tenon and a rotation shaft of FIG. 27A and FIG. 27B. FIG. 29 is an expansion view of a columnar sleeve of FIG. 27A to FIG. 27B. Referring to FIG. 27A to FIG. 29, in the present embodiment, a main difference between the moving track guider 166 and the aforementioned moving track guider 163 is that the tenon 166a of the moving track guider 166 is vertically disposed on the rotation shaft 110 but does not penetrate through the rotation shaft 110. In other words, the tenon 166a only has one end protruding out of the rotation shaft 110, as show in FIG. 28. Therefore, the columnar sleeve 166b of the moving track guider 166 is only required to configure one opening 166c, as shown in FIG. 29. The moving track guider 166 may also provide the moving track S, where the tenon 166a penetrate through the opening 166c to move along the moving track S, and the rotation shaft 110 is switched to the first stable state P1 or the second stable state P2 through the electromagnet 130 and the magnetic latching mechanism 120 (shown in FIG. 25A), as shown in FIG. 27A and FIG. 27B. At this time the rotation shaft 110 and the striking head 162 may also move along the axial direction (for example, the aforementioned z-axis) through the moving track guider 166.

Figure 30A:
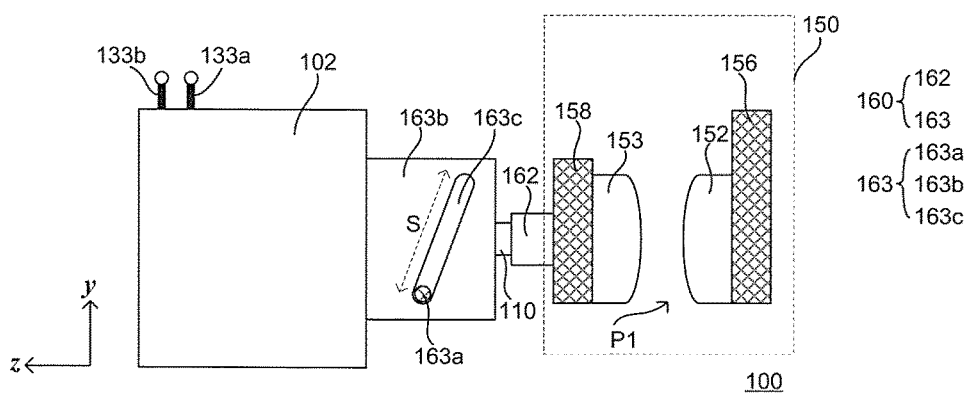
FIG. 30A and FIG. 30B are respectively side views of the bistable relay of FIG. 1 in the first stable state and the second stable state.
Figure 30B:
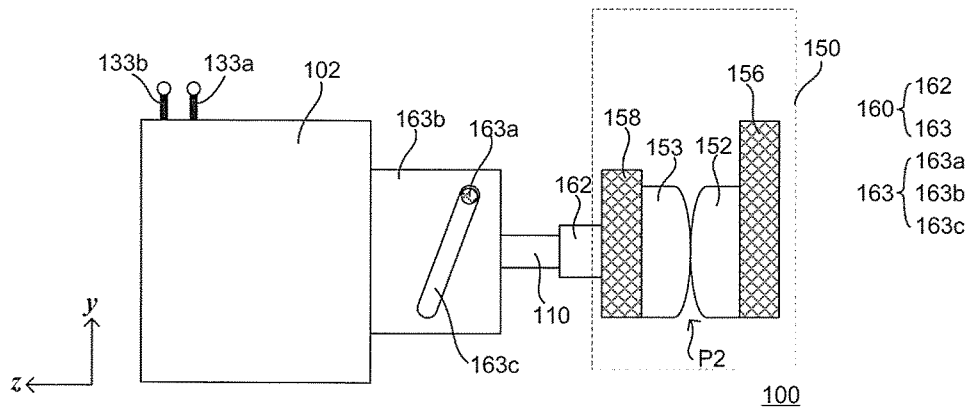

FIG. 30A and FIG. 30B are respectively side views of the bistable relay of FIG. 1 in the first stable state and the second stable state. Referring to FIG. 30A and FIG. 30B, in the present embodiment, the contact system 150 of the bistable relay 100 is connected to the impact system 160, and has at least two contact points, for example, a fixed contact point 152 and a moving contact point 153. To be specific, the bistable relay of the present embodiment further includes a base, where the base can be a carrying component of any type, for example, a substrate, a chassis, or a base 202 shown in FIG. 35, and the bistable actuator 102, the impact system 160 and the contact system 150 are disposed on the base. The contact system 150 includes the fixed contact point 152, the moving contact point 153, a fixed metal sheet 156 and a moving metal sheet 158. The fixed contact point 152 is fixed on the base (for example, fixed on a sidewall of the base) through the fixed metal sheet 156. The moving contact point 153 is configured on the striking head 162 through the moving metal sheet 158. During a process that the magnetic latching mechanism 120 of the bistable actuator 102 is switched from the first stable state P1 to the second stable state P2 or switched from the second stable state P2 to the first stable state P1 through the electromagnet 130, the rotation shaft 110 is rotated synchronously along with the magnetic latching mechanism 120 to drive the impact system 160 to move relative to the contact system 150, so as to contact or disconnect the contact points (the fixed contact point 152 and the moving contact point 153). In other words, since the rotation shaft 110 of the present embodiment stretches out or draws back along the z-axis through the moving track guider 163 of the impact system 160, and makes the striking head 162 to move along the z-axis relative to the contact system 150 for approaching or departing from the contact system 150, the moving contact point 153 configured on the striking head 162 may move relative to the fixed contact point 152. Therefore, in the present embodiment, by using the striking head 162 to drive the moving metal sheet 158 and the moving contact point 153 to depart from the fixed contact point 152, the moving contact point 153 is disconnected from the fixed contact point 152. Comparatively, by using the striking head 162 to drive the moving metal sheet 158 and the moving contact point 153 to approach the fixed contact point 152, the moving contact point 153 contacts the fixed contact point 152.

Further, when the tenon 163a moves along the moving track S, and guides the rotation shaft 110 to move along the z-axis to make the striking head 162 approaching the fixed contact point 152, the moving contact point 153 is adapted to contact the fixed contact point 152, which is shown as FIG. 30A to FIG. 30B. When the tenon 163a moves along the moving track S, and guides the rotation shaft 110 to move along the z-axis to make the striking head 162 departing from the fixed contact point 152, the moving contact point 153 is adapted to be disconnected from the fixed contact point 152, which is shown as FIG. 30B to FIG. 30A. In this way, the bistable relay 100 of the present embodiment makes the magnetic latching mechanism 120 to switch the stable state through the magnetic field generated by the electromagnet 130, so as to switch the magnetic latching mechanism 120 to the first stable state P1 or the second stable state P2, and drive the rotation shaft 110 to rotate synchronously, where the first stable state P1, for example, corresponds to mutual disconnection of the contact points of the contact system 150 shown in FIG. 30A, and the second stable state P2, for example, corresponds to mutual contact of the contact points of the contact system 150 shown in FIG. 30B. Therefore, the bistable relay 100 can be switched between two states for turning on/off a circuit. Moreover, through a closed magnetic attraction force generated by the columnar hollow magnetic conductor 123 relative to the pillar-shaped permanent magnet 122 in the magnetic latching mechanism 120, the magnetic latching mechanism 120 can be in the stable state, and a fixing force thereof is strengthened, so as to increase the contact reliability between the fixed contact point 152 and the moving contact point 153 in the contact system 150.

Figure 31A:
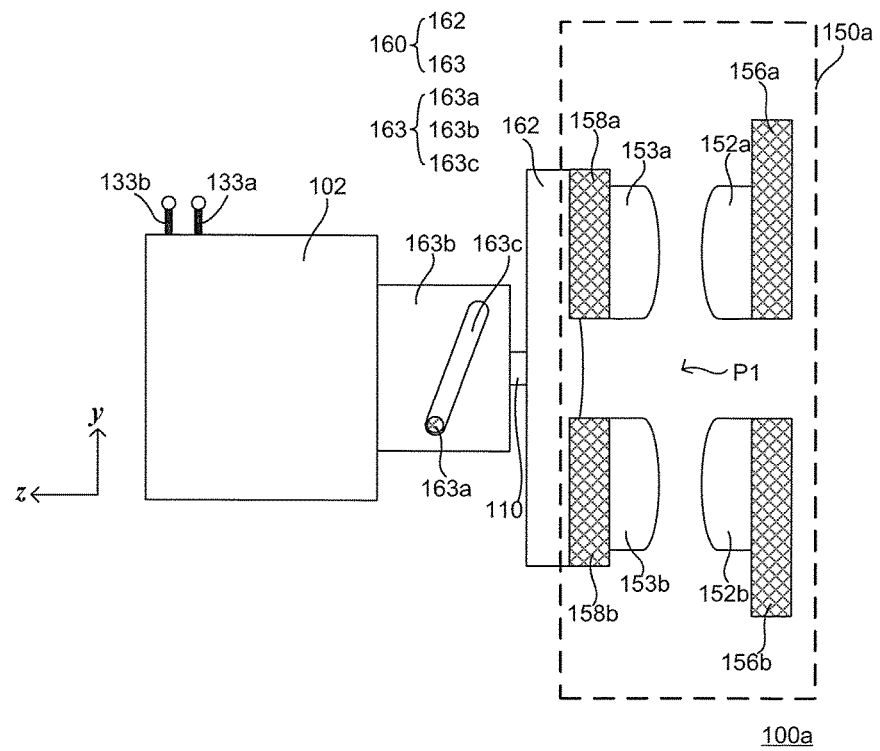
FIG. 31A and FIG. 31B, FIG. 32A and FIG. 32B, FIG. 33A and FIG. 33B, and FIG. 34A and FIG. 34B are respectively side views of a bistable relay in the first stable state and the second stable state according to other embodiment of the invention.
Figure 31B:
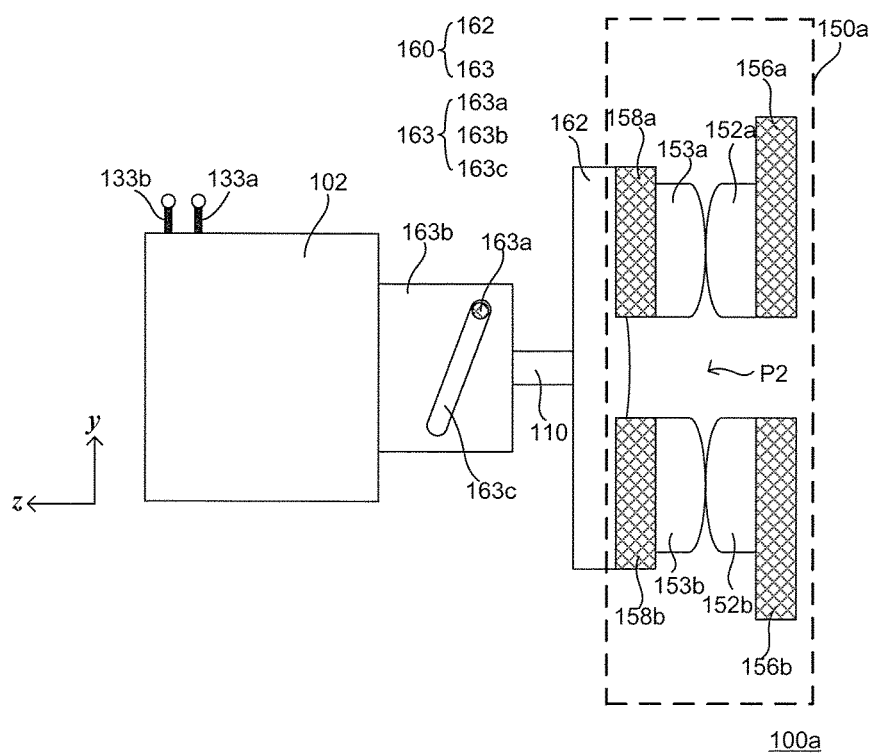

FIG. 31A and FIG. 31B are respectively side views of a bistable relay in the first stable state and the second stable state according to another embodiment of the invention. Referring to FIG. 31A and FIG. 31B, in the present embodiment, a main difference between the bistable relay 100a and the aforementioned bistable relay 100 is that the contact system 150a of the bistable relay 100a includes two fixed contact points 152a and 152b, two moving contact points 153a and 153b, two fixed metal sheets 156a and 156b and two moving metal sheets 158a and 158b. The fixed contact points 152a and 152b are respectively fixed on a base (not shown) through the fixed metal sheets 156a and 156b. The moving contact points 153a and 153b are respectively fixed on striking head 162 through the moving metal sheets 158a and 158b, where the moving contact points 153a and 153b respectively correspond to the fixed contact points 152a and 152b. Similarly, the bistable relay 100a of the present embodiment may also make the magnetic latching mechanism 120 to switch the stable state through the electromagnet 130, and the rotation shaft 110 is rotated synchronously with the magnetic latching mechanism 120 to drive the striking head 162 to stretch out or draw back along the z-axis for moving relative to the contact system 150a, so as to make the fixed contact points 152a and 152b to approach or depart from the moving contact points 153a and 153b. Therefore, the contact points of the contact system 150a are contacted or disconnected as the rotation shaft 110 and the magnetic latching mechanism 120 are switched between the first stable state P1 (shown in FIG. 31A) and the second stable state P2 (shown in FIG. 31B). In this way, the bistable relay 100a can be switched between two states for turning on/off a circuit.

Figure 32A:
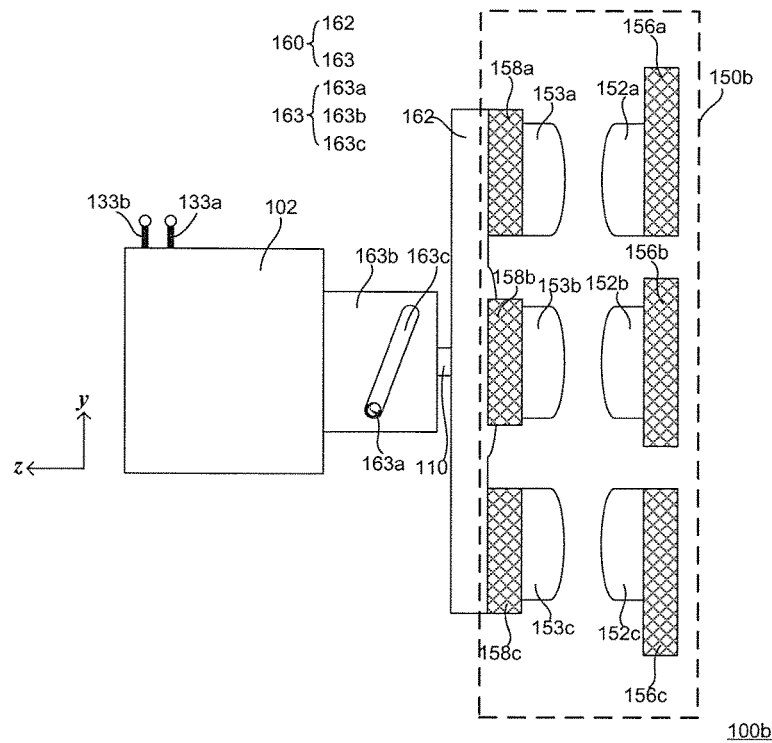
Figure 32B:
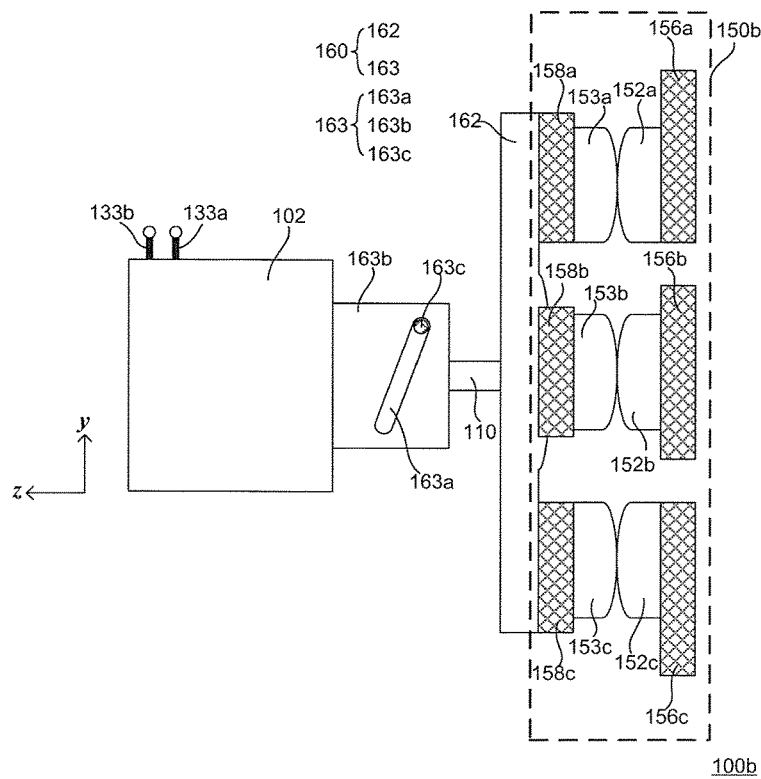

FIG. 32A and FIG. 32B are respectively side views of a bistable relay in the first stable state and the second stable state according to another embodiment of the invention. Referring to FIG. 32A and FIG. 32B, in the present embodiment, a main difference between the bistable relay 100b and the aforementioned bistable relays 100 and 100a is that the contact system 150b of the bistable relay 100b includes three fixed contact points 152a-152c, three moving contact points 153a-153c, three fixed metal sheets 156a-156c and three moving metal sheets 158a-158c. The fixed contact points 152a-152c are respectively fixed on a base (not shown) through the fixed metal sheets 156a-156c. The moving contact points 153a-153c are respectively fixed on striking head 162 through the moving metal sheets 158a-158c, where the moving contact points 153a-153c respectively correspond to the fixed contact points 152a-152c. Similarly, the bistable relay 100b of the present embodiment may also make the magnetic latching mechanism 120 to switch the stable state through the aforementioned electromagnet 130, and the contact points of the contact system 150b are contacted or disconnected as the rotation shaft 110 and the magnetic latching mechanism 120 are switched between the first stable state P1 (shown in FIG. 32A) and the second stable state P2 (shown in FIG. 32B). In this way, the bistable relay 100b can be switched between two states for turning on/off a circuit. Moreover, according to the aforementioned bistable relays 100 to 100b, it is known that the amount of the contact points in the contact system is not limited by the invention.

Figure 33A:
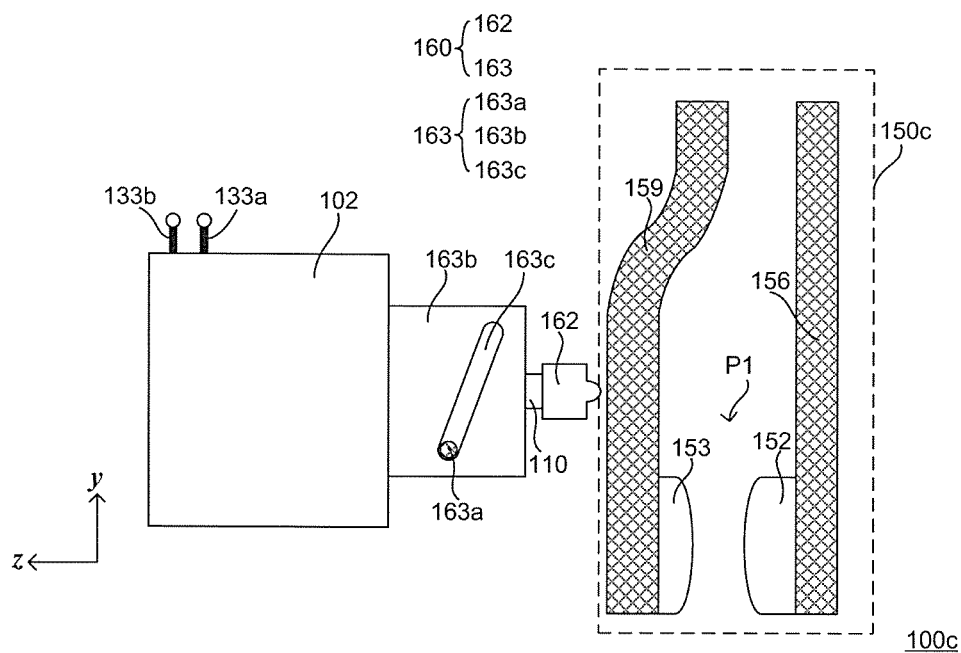
Figure 33B:
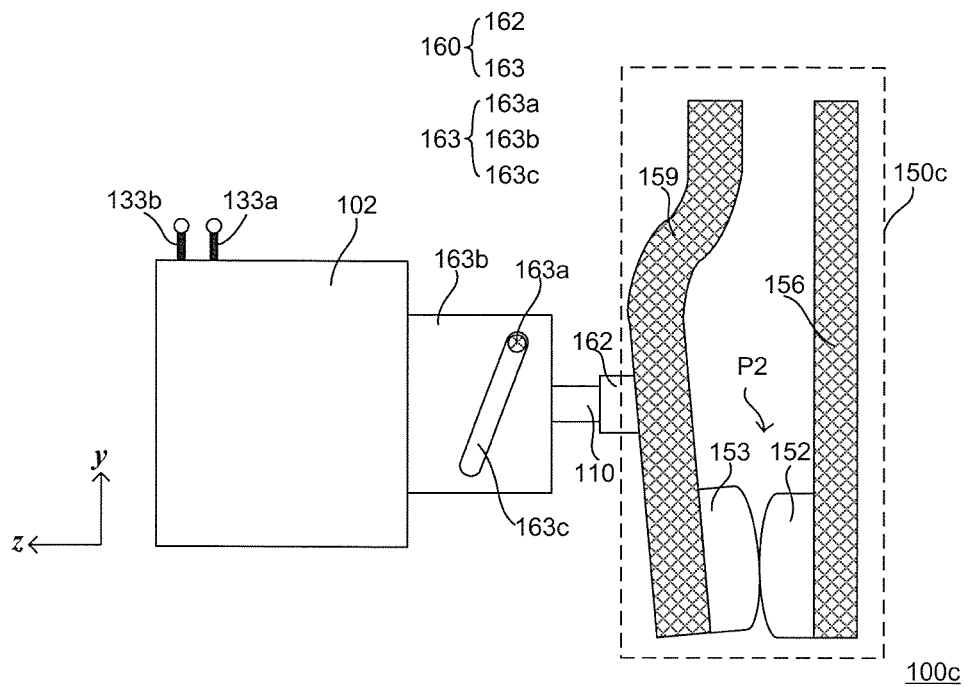

FIG. 33A and FIG. 33B are respectively side views of a bistable relay in the first stable state and the second stable state according to another embodiment of the invention. Referring to FIG. 33A and FIG. 33B, in the present embodiment, a main difference between the bistable relay 100c and the aforementioned bistable relay 100 is that the contact system 150c of the bistable relay 100c includes a fixed contact point 152, a moving contact point 153, a fixed metal sheet 156 and an elastic metal sheet 159. The fixed contact point 152 is fixed on a base (not shown) through the fixed metal sheet 156. The moving contact point 153 is fixed on the elastic metal sheet 159, and the elastic metal sheet 159 corresponds to the striking head 162. The bistable relay 100c of the present embodiment may also make the magnetic latching mechanism 120 to switch the stable state through the aforementioned electromagnet 130, and the contact points of the contact system 150c are contacted or disconnected as the rotation shaft 110 and the magnetic latching mechanism 120 are switched between the first stable state P1 (shown in FIG. 33A) and the second stable state P2 (shown in FIG. 33B). Further, when the tenon 163a moves along the moving track S, and guides the rotation shaft 110 to move along the z-axis to make the striking head 162 to approach the fixed contact point 152, the moving contact point 153 on the elastic metal sheet 159 is adapted to contact the fixed contact point 152, which is shown as FIG. 33A to FIG. 33B. Comparatively, when the tenon 163a moves along the moving track S, and guides the rotation shaft 110 to move along the z-axis to make the striking head 162 to depart from the fixed contact point 152, the moving contact point 153 on the elastic metal sheet 159 departs from the fixed contact point 152 through a restoring force of the elastic metal sheet 159, such that the moving contact point 153 is adapted to be disconnected from the fixed contact point 152, which is shown as FIG. 33B to FIG. 33A. In this way, the bistable relay 100c can be switched between two states for turning on/off a circuit.

Figure 34A:
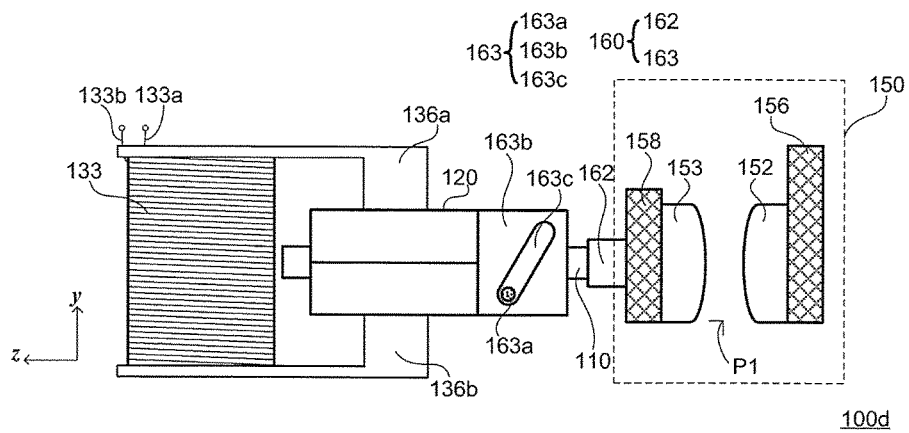
Figure 34B:
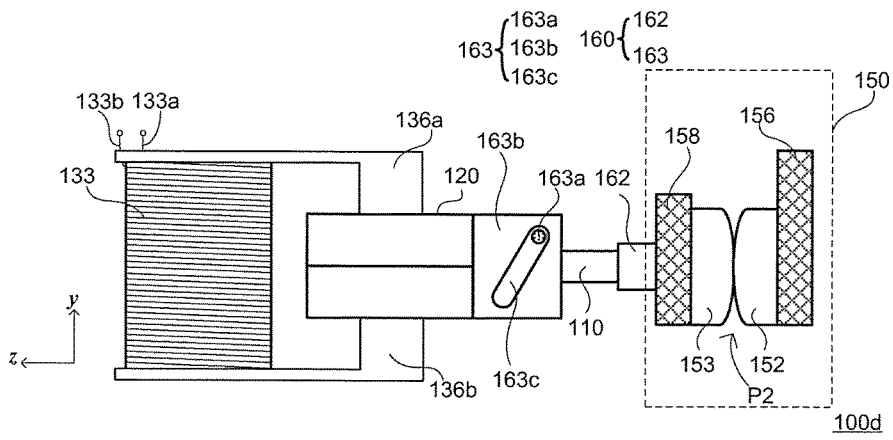

FIG. 34A and FIG. 34B are respectively side views of a bistable relay in the first stable state and the second stable state according to another embodiment of the invention. Referring to FIG. 34A and FIG. 34B, in the present embodiment, a main difference between the bistable relay 100d and the aforementioned bistable relay 100 is that the bistable relay 100d adopts the bistable actuator 102d of FIG. 21A. The bistable actuator 102d includes the rotation shaft 110, the magnetic latching mechanism 120 and the electromagnet 130d, and structures thereof may refer to the aforementioned related descriptions, and details thereof are not repeated. Since the electromagnet 130d of the bistable actuator 102d may also generate a magnetic field by introducing currents, the bistable relay 100d of the present embodiment may also make the magnetic latching mechanism 120 to switch the stable state through the electromagnet 130d, and the rotation shaft 110 drives the striking head 162 to move relative to the contact system 150, so as to make the fixed contact point 152 to approach or depart from the moving contact point 153. In this way, the bistable relay 100d can be switched between two states for turning on/off a circuit. According to the above descriptions, the invention provides a plurality of variations of the bistable actuator, the magnetic latching mechanism, the electromagnet, the impact system and the contact system, so that the bistable relays of the invention may adjust and select to use the aforementioned components according to an actual requirement. For example, the bistable actuator 102 in the aforementioned bistable relays 100 to 100c can be replaced by the bistable actuators 102a to 102c to change the type of the electromagnet. Alternatively, the contact system 150 in the aforementioned bistable relay 100d may also be replaced by the contact systems 150a to 150c, which is not limited by the invention. Since the bistable actuator of the invention may have good magnetic latching efficiency and high efficiency closed magnetic paths with low magnetic reluctance through the attraction force between the columnar hollow magnetic conductor and the pillar-shaped permanent magnet, stableness of the bistable relay in one stable state is strengthened, and when the bistable actuator is applied to the bistable relay, during a process that the magnetic latching mechanism switches the stable state, the rotation shaft is rotated synchronously along with the magnetic latching system to drive the impact system of the bistable relay to move relative to the contact system, so as to contact or disconnect the contact points. In this way, through the high efficiency magnetic latching mechanism of the bistable relay of the invention, the contact reliability of the contact system thereof is improved.

Figure 35:
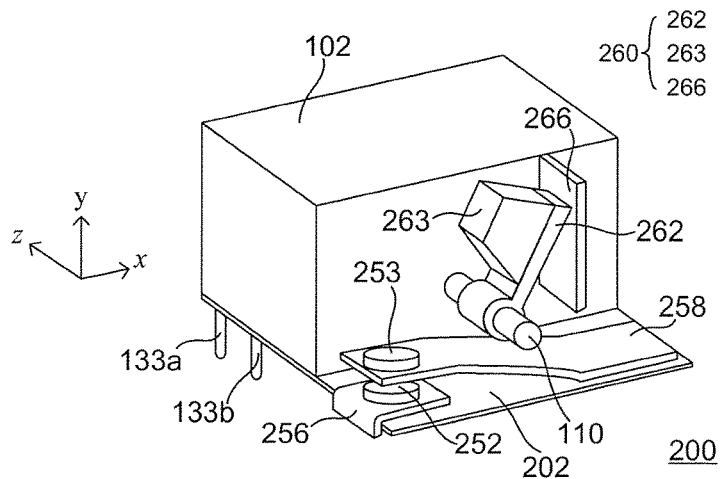
FIG. 35 is a schematic diagram of a bistable relay according to another embodiment of the invention.

FIG. 35 is a schematic diagram of a bistable relay according to another embodiment of the invention. Referring to FIG. 35, in the present embodiment, the bistable relay 200 also includes the rotation shaft 110, the magnetic latching mechanism 120 and the electromagnet 130, where the rotation shaft 110, the magnetic latching mechanism 120 and the electromagnet 130 are combined to form the bistable actuator 102. Descriptions of the rotation shaft 110, the magnetic latching mechanism 120 and the electromagnet 130 in the bistable actuator 102 may refer to the aforementioned related descriptions, and the magnetic latching mechanism 120 and the electromagnet 130 of the bistable relay 200 can be replaced by the aforementioned various variations of the magnetic latching mechanism and the electromagnet according to an actual requirement, which is not repeated. A main difference between the bistable relay 200 and the bistable relay 100 is that the bistable relay 200 includes an impact system 260 and a contact system 250. To be specific, the impact system 260 includes a rotating arm 262, a striking head 263, and a rotation blocker 266. The rotating arm 262 is disposed on one end of the rotation shaft 110. When the rotation shaft 110 is rotated through the magnetic latching mechanism 120 and the electromagnet 130, the rotation shaft 110 may drive the rotating arm 262 to rotate synchronously. The striking head 263 is disposed on the rotating arm 262. When the rotating arm 262 and the rotation shaft 110 are rotated synchronously, the rotating arm 262 may drive the striking head 263 to move relative to the contact system 250 to approach or depart from the contact system 250. The rotation blocker 266 is disposed at one side of the rotating arm 262, and is configured to limit a rotation angle of the rotating arm 262 to be smaller than 180 degrees.

On the other hand, the contact system 250 of the present embodiment is connected to the impact system 260, and has two contact points, where the contact points include a fixed contact point 252 and a moving contact point 253. Further, in the present embodiment, the bistable relay 200 can be configured with the base 202 according to an actual requirement, and the bistable actuator 102, the impact system 260 and the contact system 250 are all disposed on the base 202. The contact system 250 includes the fixed contact point 252, the moving contact point 253, a fixed metal sheet 256 and an elastic metal sheet 258. The fixed contact point 252 is fixed on the base 202 through the fixed metal sheet 256. The moving contact point 253 is disposed on the elastic metal sheet 258 and corresponds to the striking head 263, and the elastic metal sheet 258 is fixed on the base 202. Similarly, the rotation shaft 110 of the bistable relay 200 may also switch the stable state through the magnetic latching mechanism 120 and the electromagnet 130, and the rotating arm 262 is rotated synchronously along with the rotation shaft 110 to drive the striking head 263 to approach or depart from the contact system 250. Therefore, when the striking head 263 is driven by the rotating arm 262 to push the elastic metal sheet 258, the moving contact point 253 on the elastic metal sheet 258 is adapted to contact the fixed contact point 252. Comparatively, when the striking head 263 is driven by the rotating arm 262 to depart from the elastic metal sheet 258, the moving contact point 253 on the elastic metal sheet 258 departs form the fixed contact point 252 through a restoring force of the elastic metal sheet 258, such that the moving contact point 253 is adapted to be disconnected from the fixed contact point 252. In this way, although the operation method of the impact system 260 of the bistable relay 200 is different to the operation method of the impact system 160 of the aforementioned bistable relays 100 to 100d, the bistable relay 200 may also has the effect of switching between two states for turning on/off a circuit.

In summary, the magnetic latching mechanism of the bistable actuator of the invention has two opposite stable states, and the first portion and the second portion of the columnar hollow magnetic conductor of the magnetic latching mechanism are respectively spaced by the shortest first distance and second distance relative to the pillar-shaped permanent magnet, such that the columnar hollow magnetic conductor may guide the pillar-shaped permanent magnet to approach the first portion and the second portion at places corresponding to the first distance and the second distance, so that the columnar hollow magnetic conductor is adapted to guide the pillar-shaped permanent magnet to rotate to one of the stable states. Moreover, the bistable actuator of the invention makes the magnetic latching mechanism to switch the stable state through the magnetic field generated by the electromagnet, and the rotation shaft rotates synchronously along with the magnetic latching mechanism. In this way, the bistable actuator of the invention may have good magnetic latching efficiency and high efficiency closed magnetic paths with low magnetic reluctance through the attraction force between the columnar hollow magnetic conductor and the pillar-shaped permanent magnet, so as to strengthen stableness of the bistable relay in the stable state. Moreover, when the bistable actuator is applied to the bistable relay, during the process that the magnetic latching mechanism switches the stable state, the rotation shaft rotates synchronously along with the magnetic latching mechanism to drive the striking head of the impact system to move relative to the contact system, so as to contact or disconnect the contact points. In this way, the bistable relay of the invention can be used to turn on or turn off a circuit, and a magnetic latching efficiency thereof is increased through the attraction force between the columnar hollow magnetic conductor and the pillar-shaped permanent magnet of the bistable actuator, so as to strengthen the stableness of the bistable relay in the stable state, and accordingly improve the contact reliability of the contact system thereof.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A bistable relay, comprising:
   a bistable actuator, comprising:
   a magnetic latching mechanism, adapted to operate between a first stable state and a second stable state, and the magnetic latching mechanism comprising:
   a rotation shaft, disposed along an axial direction;
   a pillar-shaped permanent magnet, wrapping the rotation shaft, and comprising at least one N-pole and at least one S-pole; and
   a columnar hollow magnetic conductor, continuously surrounding the pillar-shaped permanent magnet, and maintaining a gap with the pillar-shaped permanent magnet, wherein the gap is varied along with different positions of an inner surface of the columnar hollow magnetic conductor, and is configured to guide the pillar-shaped permanent magnet to rotate to a stable position, the columnar hollow magnetic conductor comprises a first portion and a second portion respectively located at two opposite sides of the pillar-shaped permanent magnet, wherein along a radial direction relative to the axial direction, the first portion and the second portion are respectively spaced by a first distance and a second distance from the pillar-shaped permanent magnet, and the first distance is the shortest distance between the first portion of the columnar hollow magnetic conductor and the pillar-shaped permanent magnet, and the second distance is the shortest distance between the second portion of the columnar hollow magnetic conductor and the pillar-shaped permanent magnet, wherein under the first stable state, the S-pole and the N-pole of the pillar-shaped permanent magnet are respectively aligned to the first portion and the second portion of the columnar hollow magnetic conductor, and under the second stable state, the S-pole and the N-pole of the pillar-shaped permanent magnet are respectively aligned to the second portion and the first portion of the columnar hollow magnetic conductor; and
   two shells, wherein the rotation shaft wrapped by the pillar-shaped permanent magnet is disposed inside the columnar hollow magnetic conductor through the two shells; and
   an electromagnet, comprising at least one columnar magnetic conductive material connected to the columnar hollow magnetic conductor, and producing two magnetic fields in opposite directions and functioned on the pillar-shaped permanent magnet for driving the pillar-shaped permanent magnet to drive the rotation shaft to rotate clockwise or anticlockwise when two currents with different directions are introduced to the electromagnet, so as to switch the magnetic latching mechanism from the first stable state to the second stable state, or from the second stable state to the first stable state;
   an impact system, connected to the rotation shaft of the bistable actuator;
   a contact system, connected to the impact system, and having at least two contact points, wherein when the magnetic latching mechanism of the bistable actuator is switched from the first stable state to the second stable state, or is switched from the second stable state to the first stable state, the rotation shaft rotates synchronously along with the magnetic latching mechanism to drive the impact system to move relative to the contact system, so as to contact or disconnect the contact points; and
   a base, wherein the bistable actuator, the impact system and the contact system are disposed on the base.
2. The bistable relay as claimed in claim 1, wherein the electromagnet comprises:
   a coil, winding on the columnar magnetic conductive material, wherein the two magnetic fields are produced by introducing two currents with different directions to the coil, and the pillar-shaped permanent magnet generates a magnetic attraction force or a magnetic repulsion force under a function of the two magnetic fields, wherein the pillar-shaped permanent magnet is rotated relative to the columnar hollow magnetic conductor through the magnetic attraction force or the magnetic repulsion force, so as to switch the magnetic latching mechanism from the first stable state to the second stable state, or from the second stable state to the first stable state.
3. The bistable relay as claimed in claim 2, wherein the electromagnet further comprises at least one first magnetic guiding component located on the columnar magnetic conductive material and connected to the columnar magnetic conductive material, and the at least one first magnetic guiding component is configured to guide the two magnetic fields to make the columnar hollow magnetic conductor to generate the magnetic attraction force or the magnetic repulsion force relative to the pillar-shaped permanent magnet, wherein the pillar-shaped permanent magnet is rotated relative to the columnar hollow magnetic conductor through the magnetic attraction force or the magnetic repulsion force, so as to switch the magnetic latching mechanism from the first stable state to the second stable state, or from the second stable state to the first stable state.

4. The bistable relay as claimed in claim 3, wherein the electromagnet further comprises:
at least one second magnetic guiding component, connected to the first magnetic guiding component, and configured to increase electromagnetic efficiency of the electromagnet, so as to decrease an electric energy transition driving force required by the electromagnet for driving the magnetic latching mechanism.

5. The bistable relay as claimed in claim 1, wherein the columnar hollow magnetic conductor is formed integrally through casting, or formed by combining a plurality of separated magnetic conductive components.

6. The bistable relay as claimed in claim 1, wherein the impact system comprises:
a rotating arm, disposed on one end of the rotation shaft;
a striking head, disposed on the rotating arm, wherein the rotating arm is rotated synchronously along with the rotation shaft, and drives the striking head to move relative to the contact system to approach or depart from the contact system, so as to contact or disconnect the contact points; and
a rotation blocker, disposed at one side of the rotating arm, and configured to limit a rotation angle of the rotating arm to be smaller than 180 degrees.

7. The bistable relay as claimed in claim 6, wherein the contact points comprise:
at least one fixed contact point, fixed on the base; and
at least one moving contact point, disposed on an elastic metal sheet and located corresponding to the striking head, and the elastic metal sheet being fixed on the base, wherein when the striking head is driven by the rotating arm to push the elastic metal sheet, the moving contact point located on the elastic metal sheet is adapted to contact the fixed contact point, and when the striking head is driven by the rotating arm to depart from the elastic metal sheet, the moving contact point located on the elastic metal sheet departs from the fixed contact point through a restoring force of the elastic metal sheet, such that the moving contact point is adapted to disconnect the fixed contact point.

8. The bistable relay as claimed in claim 1, wherein the impact system comprises:
a striking head, disposed at one end of the rotation shaft; and
a moving track guider, connected to the rotation shaft to transform a rotation force of the rotation shaft rotated along a radial tangent into a displacement force along the axial direction, wherein the striking head is rotated synchronously along with the rotation shaft, and moves relative to the contact system along the axial direction to approach or depart from the contact system, so as to contact or disconnect the contact points.

9. The bistable relay as claimed in claim 8, wherein the moving track guider comprises:

a tenon, vertically disposed on the rotation shaft; and
a columnar sleeve, having at least one opening for providing a moving track, wherein the tenon is located in the opening, and moves along the moving track, so as to guide the rotation shaft to move along the axial direction when the rotation shaft is rotated along the radial tangent.

10. The bistable relay as claimed in claim 8, wherein the contact points comprise:
at least one fixed contact point, fixed on the base; and
at least one moving contact point, disposed on the striking head, wherein when the striking head approaches the fixed contact point, the moving contact point is adapted to contact the fixed contact point, and when the striking head departs from the fixed contact point, the moving contact point is adapted to disconnect the fixed contact point.

11. The bistable relay as claimed in claim 9, wherein the contact points comprise:
at least one fixed contact point, fixed on the base; and
at least one moving contact point, disposed on the striking head, wherein when the tenon moves along the moving track and guides the rotation shaft to move along the axial direction to make the striking head to approach the fixed contact point, the moving contact point is adapted to contact the fixed contact point, and when the tenon moves along the moving track and guides the rotation shaft to move along the axial direction to make the striking head to depart from the fixed contact point, the moving contact point is adapted to disconnect the fixed contact point.

12. The bistable relay as claimed in claim 8, wherein the contact points comprise:
at least one fixed contact point, fixed on the base; and
at least one moving contact point, disposed on an elastic metal sheet, and the elastic metal sheet corresponding to the striking head, wherein when the striking head approaches the fixed contact point, the moving contact point is adapted to contact the fixed contact point, and when the striking head departs from fixed contact point, the moving contact point departs from the fixed contact point through a restoring force of the elastic metal sheet, such that the moving contact point is adapted to disconnect the fixed contact point.

13. The bistable relay as claimed in claim 9, wherein the contact points comprise:
at least one fixed contact point, fixed on the base; and
at least one moving contact point, disposed on an elastic metal sheet, and the elastic metal sheet corresponding to the striking head, wherein when the tenon moves along the moving track and guides the rotation shaft to move along the axial direction to make the striking head to approach the fixed contact point, the moving contact point is adapted to contact the fixed contact point, and when the tenon moves along the moving track and guides the rotation shaft to move along the axial direction to make the striking head to depart from the fixed contact point, the moving contact point departs from the fixed contact point through a restoring force of the elastic metal sheet, such that the moving contact point is adapted to disconnect the fixed contact point.

14. A bistable actuator, comprising:
a magnetic latching mechanism, adapted to operate between a first stable state and a second stable state, and the magnetic latching mechanism comprising:
a rotation shaft, disposed along an axial direction;

a pillar-shaped permanent magnet, wrapping the rotation shaft, and comprising at least one N-pole and at least one S-pole; and a columnar hollow magnetic conductor, continuously surrounding the pillar-shaped permanent magnet, and maintaining a gap with the pillar-shaped permanent magnet, wherein the gap is varied along with different positions of an inner surface of the columnar hollow magnetic conductor, and is configured to guide the pillar-shaped permanent magnet to rotate to a stable position, the columnar hollow magnetic conductor comprises a first portion and a second portion respectively located at two opposite sides of the pillar-shaped permanent magnet, wherein along a radial direction relative to the axial direction, the first portion and the second portion are respectively spaced by a first distance and a second distance from the pillar-shaped permanent magnet, and the first distance is the shortest distance between the first portion of the columnar hollow magnetic conductor and the pillar-shaped permanent magnet, and the second distance is the shortest distance between the second portion of the columnar hollow magnetic conductor and the pillar-shaped permanent magnet, wherein under the first stable state, the S-pole and the N-pole of the pillar-shaped permanent magnet are respectively aligned to the first portion and the second portion of the columnar hollow magnetic conductor, and under the second stable state, the S-pole and the N-pole of the pillar-shaped permanent magnet are respectively aligned to the second portion and the first portion of the columnar hollow magnetic conductor; and two shells, wherein the rotation shaft wrapped by the pillar-shaped permanent magnet is disposed inside the columnar hollow magnetic conductor through the two shells; and an electromagnet, comprising at least one columnar magnetic conductive material connected to the columnar hollow magnetic conductor, and producing two magnetic fields in opposite directions and functioned on the pillar-shaped permanent magnet for driving the pillar-shaped permanent magnet to drive the rotation shaft to rotate clockwise or anticlockwise when two currents with different directions are introduced to the electromagnet, so as to switch the magnetic latching mechanism from the first stable state to the second stable state, or from the second stable state to the first stable state.

15. The bistable actuator as claimed in claim 14, wherein the electromagnet comprises:

a coil, winding on the columnar magnetic conductive material, wherein the two magnetic fields are produced by introducing two currents with different directions to the coil, and the pillar-shaped permanent magnet generates a magnetic attraction force or a magnetic repulsion force under a function of the two magnetic fields, wherein the pillar-shaped permanent magnet is rotated relative to the columnar hollow magnetic conductor through the magnetic attraction force or the magnetic repulsion force, so as to switch the magnetic latching mechanism from the first stable state to the second stable state, or from the second stable state to the first stable state.

16. The bistable actuator as claimed in claim 15, wherein the electromagnet further comprises at least one first magnetic guiding component located on the columnar magnetic conductive material and connected to the columnar magnetic conductive material, and the at least one first magnetic guiding component is configured to guide the two magnetic fields to make the columnar hollow magnetic conductor to generate the magnetic attraction force or the magnetic repulsion force relative to the pillar-shaped permanent magnet, wherein the pillar-shaped permanent magnet is rotated relative to the columnar hollow magnetic conductor through the magnetic attraction force or the magnetic repulsion force, so as to switch the magnetic latching mechanism from the first stable state to the second stable state, or from the second stable state to the first stable state.

17. The bistable actuator as claimed in claim 16, wherein the electromagnet further comprises:

at least one second magnetic guiding component, connected to the first magnetic guiding component, and configured to increase electromagnetic efficiency of the electromagnet, so as to decrease an electric energy transition driving force required by the electromagnet for driving the magnetic latching mechanism.

18. The bistable actuator as claimed in claim 14, wherein the columnar hollow magnetic conductor is formed integrally through casting, or formed by combining a plurality of separated magnetic conductive components.

* * * * *